US007744468B2

(12) United States Patent
Boyd et al.

(10) Patent No.: US 7,744,468 B2
(45) Date of Patent: Jun. 29, 2010

(54) EVENT CALENDAR AT ELECTRONIC GAMING DEVICE

(75) Inventors: Scott Boyd, Reno, NV (US); Shannon Mason, Reno, NV (US); Kevan Wilkins, Reno, NV (US); Perry Cobb, Reno, NV (US); Miles Patceg, Reno, NV (US)

(73) Assignee: IGT, Reno, NV (US)

( * ) Notice: Subject to any disclaimer, the term of this patent is extended or adjusted under 35 U.S.C. 154(b) by 974 days.

(21) Appl. No.: 11/082,003

(22) Filed: Mar. 15, 2005

(65) Prior Publication Data

US 2005/0215310 A1 Sep. 29, 2005

Related U.S. Application Data

(60) Provisional application No. 60/553,481, filed on Mar. 15, 2004.

(51) Int. Cl.
*A63F 13/00* (2006.01)

(52) U.S. Cl. .............................. 463/42; 463/16; 463/29; 463/30; 463/31

(58) Field of Classification Search .................. 463/16, 463/29–31, 42
See application file for complete search history.

(56) References Cited

U.S. PATENT DOCUMENTS

| | | | | |
|---|---|---|---|---|
| 5,370,399 | A * | 12/1994 | Liverance | 463/23 |
| 5,429,361 | A * | 7/1995 | Raven et al. | 463/25 |
| 5,655,961 | A | 8/1997 | Acres et al. | |
| 5,761,647 | A * | 6/1998 | Boushy | 705/10 |
| 5,779,549 | A * | 7/1998 | Walker et al. | 463/42 |
| 6,039,648 | A * | 3/2000 | Guinn et al. | 463/16 |
| 6,110,041 | A * | 8/2000 | Walker et al. | 463/20 |
| 6,267,671 | B1 * | 7/2001 | Hogan | 463/25 |
| 6,319,125 | B1 | 11/2001 | Acres | |
| 6,712,698 | B2 * | 3/2004 | Paulsen et al. | 463/30 |
| 6,843,723 | B2 * | 1/2005 | Joshi | 463/25 |
| 6,848,995 | B1 * | 2/2005 | Walker et al. | 463/25 |
| 6,939,226 | B1 * | 9/2005 | Joshi | 463/20 |
| 7,303,475 | B2 * | 12/2007 | Britt et al. | 463/42 |

(Continued)

OTHER PUBLICATIONS

International Search Report and Written Opinion Of The International Searching Authority dated Apr. 22, 2008, for corresponding PCT Application No. PCT/US2005/08671.

*Primary Examiner*—Peter DungBa Vo
*Assistant Examiner*—William H McCulloch
(74) *Attorney, Agent, or Firm*—Weaver Austin Villeneuve & Sampson LLP

(57) ABSTRACT

A method and apparatus for operating networked gaming devices to display a calendar image within a promotions display on a gaming machine. The method includes configuring a promotion at a configuration workstation coupled over a network to a plurality of gaming devices. Players are permitted to play one of the gaming devices with each of said gaming device having a touch screen display. A calendar graphic is displayed within the touch screen display having of a plurality of day boxes, with the promotion associated with and displayed within one of the day boxes. Information about the promotion is communicated to the player via the touch screen display associated with the gaming device. The method and apparatus accepts a communication from the player via the touch screen display indicative of a player selection of the promotion displayed in one of the day boxes, and implements the promotion responsive to the selection.

16 Claims, 16 Drawing Sheets

U.S. PATENT DOCUMENTS

| | | | | |
|---|---|---|---|---|
| 7,329,185 | B2 * | 2/2008 | Conover et al. | 463/25 |
| 7,367,885 | B2 * | 5/2008 | Escalera et al. | 463/32 |
| 7,384,338 | B2 * | 6/2008 | Rothschild et al. | 463/29 |
| 2001/0013050 | A1 * | 8/2001 | Shah | 709/202 |
| 2001/0017707 | A1 * | 8/2001 | Lee | 358/1.12 |
| 2002/0023230 | A1 * | 2/2002 | Bolnick et al. | 713/202 |
| 2002/0038316 | A1 * | 3/2002 | Onyon et al. | 707/204 |
| 2002/0039923 | A1 * | 4/2002 | Cannon et al. | 463/42 |
| 2002/0077170 | A1 * | 6/2002 | Johnson et al. | 463/16 |
| 2002/0142846 | A1 * | 10/2002 | Paulsen | 463/43 |
| 2002/0151349 | A1 * | 10/2002 | Joshi | 463/20 |
| 2002/0169659 | A1 * | 11/2002 | Bollapragada et al. | 705/14 |
| 2003/0013527 | A1 * | 1/2003 | Rowe et al. | 463/42 |
| 2003/0069071 | A1 * | 4/2003 | Britt et al. | 463/42 |
| 2003/0100360 | A1 * | 5/2003 | Manfredi et al. | 463/25 |
| 2003/0176219 | A1 * | 9/2003 | Manfredi et al. | 463/25 |
| 2004/0032086 | A1 * | 2/2004 | Barragan | 273/292 |
| 2004/0142742 | A1 * | 7/2004 | Schneider et al. | 463/25 |
| 2004/0152516 | A1 * | 8/2004 | Blatter et al. | 463/42 |
| 2004/0242294 | A1 * | 12/2004 | Shiozawa | 463/9 |
| 2005/0009601 | A1 * | 1/2005 | Manfredi et al. | 463/29 |
| 2005/0119052 | A1 * | 6/2005 | Russell et al. | 463/42 |
| 2005/0215310 | A1 * | 9/2005 | Boyd et al. | 463/20 |
| 2007/0026916 | A1 * | 2/2007 | Juds et al. | 463/1 |
| 2008/0153567 | A1 * | 6/2008 | Juds et al. | 463/16 |
| 2008/0234040 | A1 * | 9/2008 | Davies | 463/26 |
| 2009/0048022 | A1 * | 2/2009 | Iddings et al. | 463/42 |

* cited by examiner

58

EVENT CALENDAR AT ELECTRONIC GAMING DEVICE

CROSS-REFERENCE TO RELATED APPLICATIONS

This application claims the benefit from U.S. Provisional Patent Application No. 60/553,481 filed Mar. 15, 2004 whose contents are incorporated herein for all purposes.

BACKGROUND OF THE INVENTION

1. Field of the Invention

This invention relates generally to electronic gaming machines and more particularly to a method and apparatus for presenting a personalized calendar of events to the player while at the gaming machine.

2. Description of the Prior Art

Incorporating casino slot machines into a computer network is well known. Early in the deployment of such networks, preexisting slot machines were retrofitted by installing a communications board that included a processor, memory and other components that facilitated communications between the electronic slot machine and the network. When so configured, transactions at one of slot machines could be communicated via the board onto the network and from there to a computer that stored the transactions for later analysis and verification. Conversely, the network computer can issue commands onto the network that are addressed to a particular machine or a group of machines. The communications board receives the command and communicates with the slot machine to effect, for example, payment of a bonus over and above the pay table in the slot machine as described in U.S. Pat. No. 5,655,961 (the '961 patent), which is owned by the assignee of the present application and which is incorporated herein by reference for all purposes.

In addition to the communications board, it is well known to install a card reader, a display, and a keypad at each slot machine to facilitate player tracking, as it is referred to in the industry. In a conventional player-tracking system, each player is assigned a card and an associated account, which is maintained on a network computer. Before playing one of the slot machines, the player inserts his or her card to cause points proportionate to play to accrue in his or her account. The points are then redeemable by the player for additional play, complimentary meals, merchandise, or the like. In addition, the card, keypad, and display—typically implemented as a vacuum fluorescent display or a small-character LCD display—can be used to permit a player to access a cashless play account or to access credits that are either complimentary or awarded to the player during the course of his or her play.

The design, construction and operation of networked slot machines, including the card reader, the keypad and the display, as mentioned above, is described in detail in the '961 patent. Another embodiment is also described in U.S. Pat. No. 6,319,125 for a Method and Apparatus for Promoting Play on a Network of Gaming Devices, which is also assigned to the assignee of the present application and which is also incorporated herein by reference for all purposes.

However, since competition for players is intense in the gaming industry, the need exists for additional bonusing and notification features that create additional attraction and play opportunities for the players.

SUMMARY OF THE INVENTION

The present invention integrates the concepts of interactive player-based promotions and calendar tracking that utilize a display, such as a touch screen display, on a gaming system associated with a remote player tracking system. The promotions and calendar events can be configured at a remote configuration workstation by selecting system criteria defining the particular bonus promotion.

A graphic or series of graphics are displayed on a gaming machine informational display such as an the NexGen Display available through Acres Gaming of Las Vegas, Nev., or on any video electronic gaming machine (EGM) that is connected to a casino management system, such as the Acres' system. Yet another method of presentation would be on the video screen of a player Kiosk or terminal that serviced an area of the casino floor. The preferred presentation graphics are calendars containing boxes that represent the days of the month, much like any paper calendar. There is also a title area that shows the range of the calendar and has room for events that span the entire range of the calendar. Within each day box, the casino can graphically advertise future casino events, promotions, general casino gambling, and bonusing opportunities scheduled or occurring on those specific days. These events are referred to herein collectively as items in the text.

Multiple items can be represented in a single day box by animating the graphics, so that the player sees a rotation of items in the day boxes of the calendar. Players are prompted through calendar graphics and sound to "touch the day or item of interest," which causes the display to expand to a full screen detailed graphic of the day and/or item. After reading the content, the player will time-out or press a button to return to the calendar screen. From there the player can touch another day of interest.

The calendar can play in several contexts, each with different content (graphics and sound) if desired. When the EGM is idle (no player), content can refer to generic items available to all customers in a casino. When the EGM is played by a player with no club card, content can be shifted to prompt him to become a club card member. As an example, the calendar could advertise a promotional "sign up day" every Tuesday.

When the player tracking system detects that a carded player is playing the EGM, the calendar content can become highly specific to that player, using information about the player provided by the tracking system databases. Items such as player-specific bonuses/events/participation/status, player history, ranking, preferences, etc. can be displayed on the player-specific calendar. When a player has selected a day for detailed examination, an event message can be generated by the display or the EGM that travels through the gaming network, resulting in an alert to a terminal or pager, notifying casino personnel who may want to follow up on this player-expressed interest with personal interaction.

The invention further includes a gaming machine on which is displayed a calendar for gamblers implementing specialized attract features. During the various attract panels, the calendar cycles through about three times with five seconds or so on each of the three calendar screens. Each screen is slightly different and discloses different events with a subsequent panel having Touch Here on the date instead of the event. The player therefore is urged to touch the screen, thereby producing a full panel that provides more information about the event or promotion, such as half-price room rates. There is also a voiceover narration that urges the player to touch any day. The voiceover can also talk about a particular event after it is expanded. In addition, the panels will time out and/or be provided with a back button. There can be a player-specific full screen when a player card is in, e.g., Especially For You Bill Smith.

The foregoing and other objects, features and advantages of the invention will become more readily apparent from the following detailed description of a preferred embodiment of the invention that proceeds with reference to the accompanying drawings.

DETAILED DESCRIPTION

Figure 1:
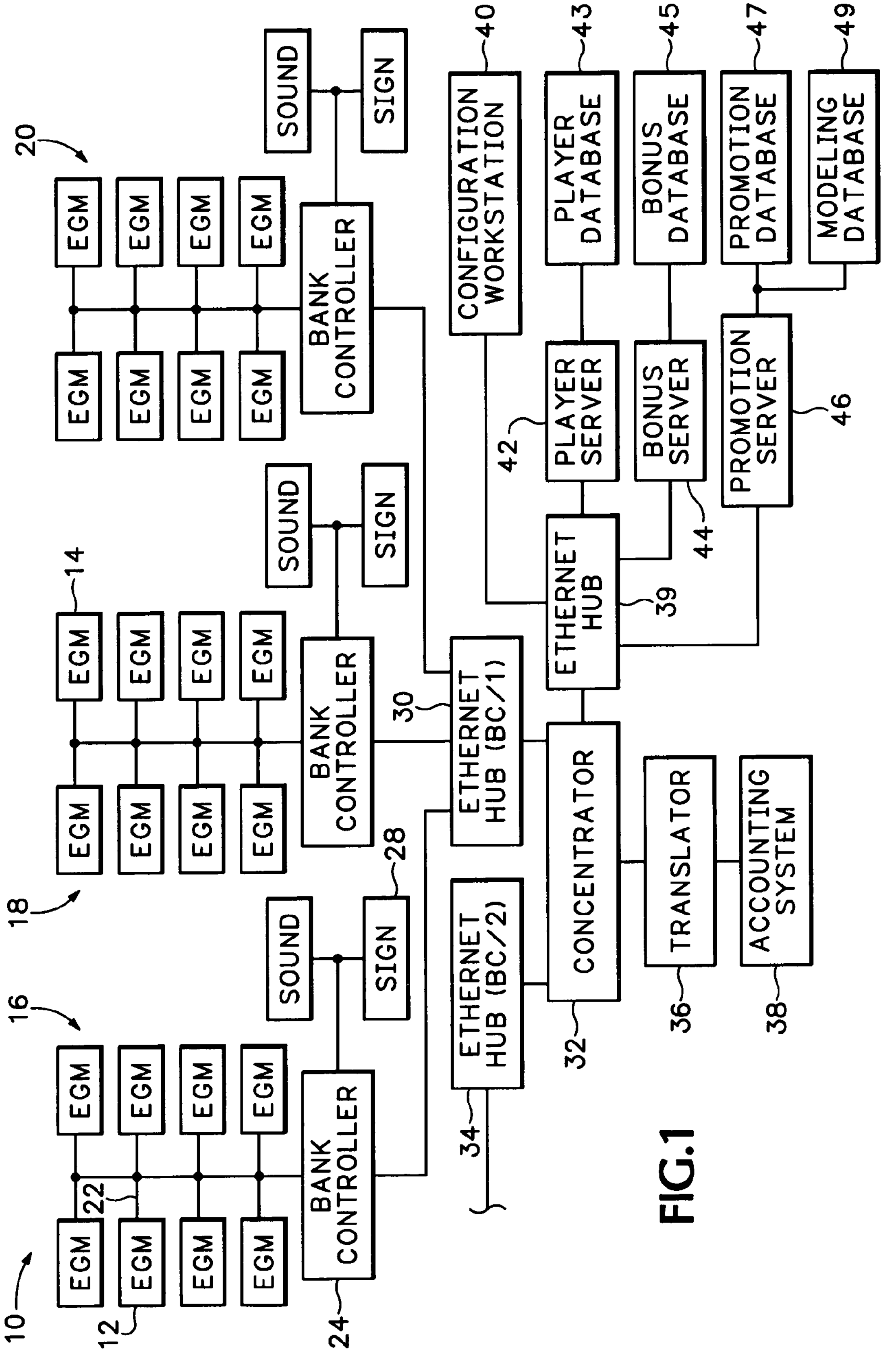
FIG. 1 is a schematic diagram of a plurality of electronic gaming machines interconnected by a computer network to a host computer in accordance with a networked embodiment of the present invention.

Turning now to FIG. 1, indicated generally at 10 is a schematic diagram illustrating electronic gaming machines (EGMs), like EGMs 12, 14, interconnected by a computer network. Included therein are three banks, indicated generally at 16, 18, 20, of EGMs. Each EGM is connected via a network connection, like connection 22, to a bank controller 24. In the present embodiment of the invention, each bank controller comprises a processor that facilitates data communication between the EGMs in its associated bank and the other components on the network. The bank controller may also include a CD ROM drive for transmitting digitized sound effects, such as music and the like, to a speaker 26 responsive to commands issued over the network to bank controller 24. The bank controller may also be connected to an electronic sign 28 that displays information, such as jackpot amounts and the like, visible to players of machines on bank 16. Such displays are generated and changed responsive to commands issued over the network to bank controller 24. Each of the other banks 18, 20 of EGMs include associated bank controllers, speakers, and signs as shown, which operate in substantially the same manner.

Ethernet hub 30 connects each of the bank controllers associated with banks 16, 18, 20 of EGMs to a concentrator 32. Another Ethernet hub 34 connects similar bank controllers (not shown), each associated with an additional bank of EGMs (also not shown), to concentrator 32. The concentrator functions as a data control switch to route data from each of the banks to a translator 36. The translator comprises a compatibility buffer between the concentrator and a proprietary accounting system 38. It functions to place all the data gathered from each of the bank controllers into a format compatible with accounting system 38. The present embodiment of the invention, translator 38 comprises an Intel Pentium 200 MHz Processor operating Microsoft Windows NT 4.0.

Another Ethernet hub 39 is connected to a configuration workstation 40, a player server 42, a bonus server 44 and a promotion server 46. Hub 39 facilitates data flow to or from the configuration workstation 40 and the servers 42, 44, and 46. Additionally, the servers 42, 44, and 46 communicate through the concentrator 32 to the bank controllers 24, which, in turn, communicate with the particular gaming devices 12.

The configuration workstation 40 has a user interface that allows portions of the network 10 and the servers 42, 44, and 46 to be set up and modified. The configuration workstation 40 could include a personal computer having a keyboard, monitor, microprocessor, memory, an operating system, and a network card coupled to the Ethernet hub 30.

The player server 42 includes a microcomputer that is used to track data of players using the gaming devices 12. The player server 42 is coupled to a player database 43 where the player tracking data is stored. Another function of the player server 42 is to control messages that appear on display 58 (FIG. 2) associated with each gaming device 12 and the messages on the signs 28 coupled to the bank server 24. The player server 42 may be embodied in a microcomputer including, for instance an Intel Pentium Processor, Microsoft operating system and a network card to couple the server to the Ethernet hub 39.

The bonus server 44 is embodied by a microcomputer and is used to control bonus applications or bonus systems on the gaming network 10. The bonus server 44 is coupled to a database 45 where bonus data is stored. In one implementation, the bonus server 44 includes a set of rules for awarding jackpots in excess of those established by the winning pay tables of each gaming device 12. Some bonus awards may be made randomly, while others may be made to link to groups of gaming devices 12 operating in a progressive jackpot mode. Specific examples of such bonuses and networks used to implement them include those as described in U.S. patents mentioned above and previously incorporated, as well as the various implementations described further below.

The promotion server 46 is coupled to a promotion database 47 and a modeling parameters database 49. The promotion server 46 includes functions and processes operative to generate signals to cause a system award to be generated, and to communicate the generated system award to the particular gaming device 12 at which the player receiving the award can receive the award.

Data of different types of system and/or bonus awards and how and when the awards are generated can be stored in the promotion database 47. For instance, the text that is printed on an award, or bar-codes that are printed on the award ticket can be stored on the promotion database 47. Modeling parameters and data can be stored on the modeling parameters database 49. For instance, conditions that when satisfied cause an award ticket to be generated can be stored on this database. Such data could include the number of hours a player must play at a requisite coin-in level to cause a complementary meal ticket to be awarded to the player. Many examples of system awards and parameters used to implement them are discussed in detail below.

In determining when to grant a bonus or system award, the promotion server 46 can access data stored anywhere on the network, such as: from any of the databases 43, 45, 47 and 49; from the configuration workstation 40; from the bank controller 24; from the accounting system 38; and from the bonus engine 50 (FIG. 2) on any or all of the gaming devices 12 coupled to the computer network 10. Additionally, the computer network 10 illustrated in FIG. 1 is only an example gaming network. Those skilled in the art will appreciate that embodiments of the invention can operate on any acceptable network, even if it differs from the one illustrated in FIG. 1.

An award can be generated based on player modeling in conjunction with data stored on database 49. Data can take the form, for instance, of behavior characteristics of known players to various promotions granted over the network. An example is where data from previous players who have won a large award, say $2000, would cash out and often stop playing at the casino which prevents the casino from winning its money back. The data would establish a trend in players receiving that type of award, so that a player would be offered an accompanying promotion, such as a free lunch or dinner at the casino for that night only, in order to keep the player at the game or in the casino. These types of real-time behavior characteristics can be tracked by the system and acted upon by the promotions system.

When the promotion server 46 determines that an award should be generated, it sends appropriate signals to the bonus engine 50 of the appropriate gaming device 12 through the gaming network 10 to deliver the award. As discussed above, one such method of award delivery is to cause an award ticket to be printed for the player, but others such as points, cash back, and promotional coupons can also be contemplated. Examples of bonuses that can be implemented on the network are disclosed in co-owned U.S. Pat. No. 6,319,125 (the '125 patent), which is incorporated herein by reference for all purposes. This co-owned patent also describes in more detail features of the network, like that shown in FIG. 1, which may be used to implement the present invention. The '961 patent also discloses bonuses that can be implemented by bonus and promotional servers 44, 46 and a network that could be used to implement the present invention.

As used herein the term jackpot indicates an award made resulting from the pay table on one of the EGMs while the term bonus indicates an award that does not result from the machine's pay table. The '125 patent and '961 patent include many examples of bonuses. The term award is intended to encompass any payment given to a player of one of the EGMs and includes both jackpots and bonuses.

Figure 2:
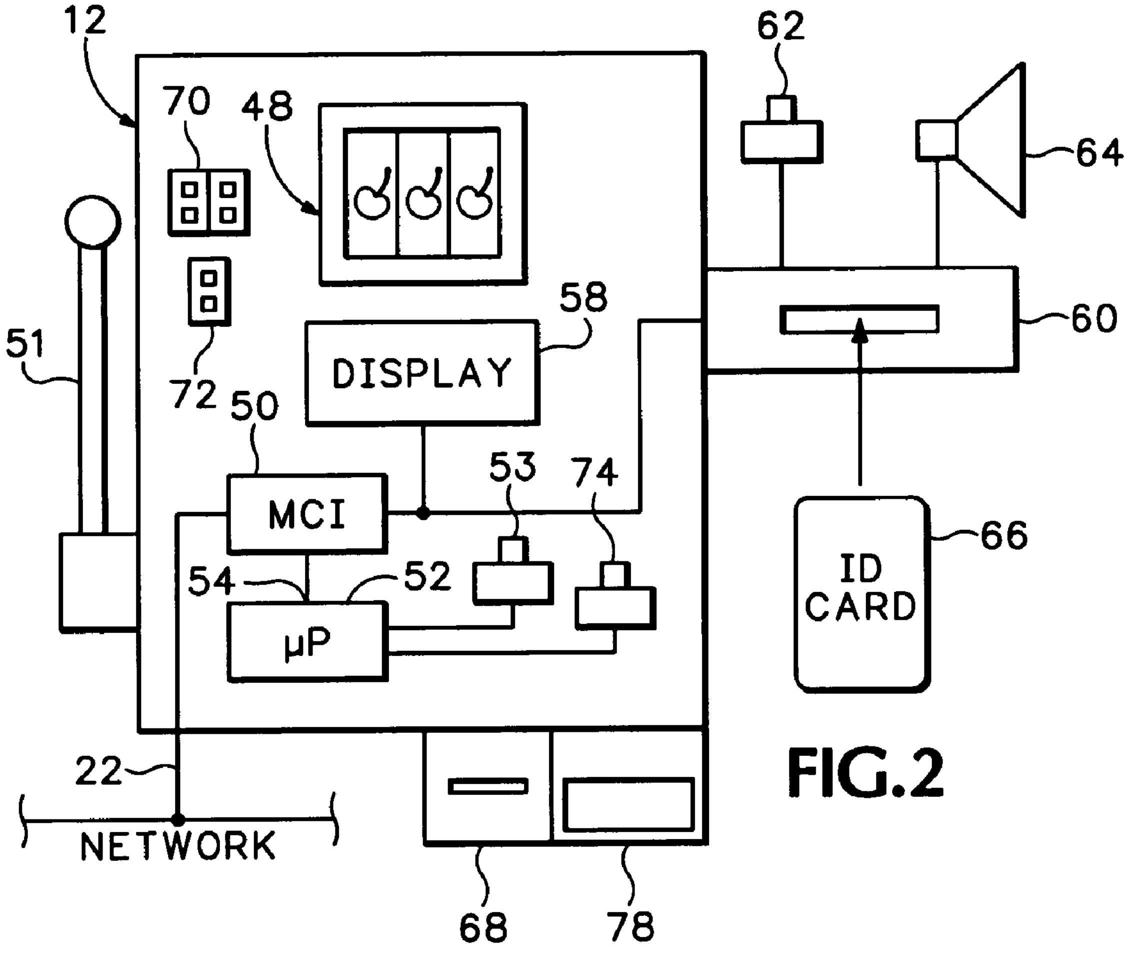
FIG. 2 is a schematic diagram of a slot machine and associated hardware, including the secondary bonus screen for displaying the bonus promotion implemented according to the invention.

FIG. 2 illustrates a gaming machine 12 constructed according to a preferred embodiment of the invention. Included is a highly schematic representation of an electronic slot machine—typical of each of the machines in the network—that incorporates network communications hardware as described hereinafter. This hardware is described in the '961 patent, and is referred to therein as a data communications node. Preferably the network communications hardware is like that disclosed in the '125 patent, namely a machine communication interface (MCI) 50.

MCI 50 facilitates communication between the network, via connection 22, and microprocessor 52, which controls the operation of EGM 12. This communication occurs via a serial port 54 on the microprocessor to which MCI 50 is connected.

Included in EGM 12 are three reels, indicated generally at 48. Each reel includes a plurality of different symbols thereon. The reels spin in response to a pull on handle 51 or actuation of a spin button 53 after a wager is made. In one specific implementation of the bonus, one or all of the reels 48 may include a special bonus initiator symbol which, when obtained on the gaming machine's payline, will cause the MCI 50 to initiate a secondary bonus game or other bonus event as described below. It will be appreciated, of course, that the current invention is not limited to use with physical or virtual reel-based gaming machines and that other machines, such as poker or keno machines, are possible.

MCI 50 includes a random access memory (RAM), which can be used as later described herein. The MCI also facilitates communication between the network and an liquid crystal display (LCD) or vacuum florescent display (VFD) 58, a card reader 60, a player-actuated push button 62, and a speaker 64.

Before describing play according to the invention, a description will first be made of typical play on a slot machine, like EGM 12. A player plays EGM 12 by placing a wager and then pulling handle 51 or depressing spin button 53. The wager may be placed by inserting a bill into a bill acceptor 68. A typical slot machine, like EGM 12, includes a coin acceptor that may also be used by the player to make a wager. Other elements incorporated into the electronic gaming machine 12 include a bill acceptor, coin-in meter 72, and a credit meter 74 having a numeric display that indicates the total number of credits available for the player to wager. The credits are in the base denomination of the machine. For example, in a nickel slot machine, when a five-dollar bill is inserted into the bill acceptor, a credit of 100 appears on the credit meter. To place a wager, the player depresses a coin-in button, which transfers a credit from the credit meter to a coin-in meter. Each time the button is depressed a single credit transfers to the coin-in meter up to a maximum bet that can be placed on a single play of the machine. In addition, a maximum-bet button may be provided to immediately transfer the maximum number of credits that can be wagered on a single play from the credit meter to the coin-in meter.

When the coin-in meter 72 reflects the number of credits that the player intends to wager, the player depresses spin button 53 thereby initiating the base game.

The player may choose to have any jackpot won applied to credit meter 70. When the player wishes to cash out, the player depresses a cash-out button 74, which causes the credits on meter 70 to be paid in coins to the player at a hopper 78, which is part of machine 12. The machine consequently pays to the player, via hopper 78, the number of coins—in the base denomination of the machine—that appear on credit meter 70.

Card reader 60 reads a player-tracking card 66 that is issued by the casino to individual players who choose to have such a card. Card reader 60 and player-tracking card 66 are known in the art, as are player-tracking systems, examples being disclosed in the '961 patent and '125 patent. Briefly summarizing such a system, a player registers with the casino prior to commencing gaming. The casino issues a unique player-tracking card to the player and opens a corresponding player account that is stored on accounting system 38 (in FIG. 1). Accounting system 38 is referred to herein as a host computer. It should be appreciated, however, that the host computer can be distributed on the network and could include multiple processors or memories. The account includes the player's name and mailing address and perhaps other information of interest to the casino in connection with marketing efforts.

Prior to playing one of the EGMs in FIG. 1, the player inserts card 66 into reader 60 thus permitting accounting system 38 to track player activity, such as amounts wagered and won and rate of play.

Turning next to FIGS. 3-6, indicated generally at 80 is the upper portion of slot machine 12. The slot machine is a commercially available electronic gaming device that has been modified as described herein.

Figure 9:
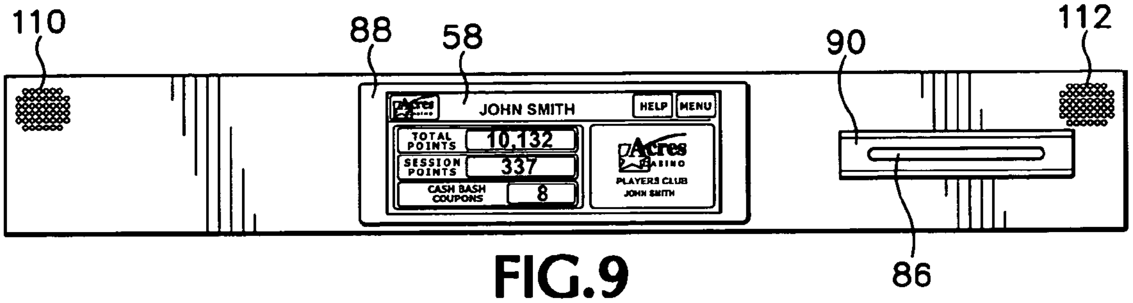
FIG. 9 is a view of the display and card reader on the slot machine of FIG. 3, including an image depicted on the display screen.

One aspect of the modifications to slot machine 12 includes addition of a bracket 82 mounted on the front of the slot machine. The bracket includes two openings, the first containing a 640×240 pixel touch-panel liquid crystal display ("LCD") 58. In the present embodiment of the invention, LCD 58 comprises a Hitachi SX16H005-AZA LCD although it is of course possible to use other types of displays therein. The second opening 84, in FIG. 3, contains a card reader 60 having a slot 86 (visible in FIG. 9), into which a player's card is received as is known in the art. As shown in FIG. 9, both LCD 58 and slot 86 are framed by respective bezels 88, 90. Card reader bezel 90 and slot 86 are shown in FIG. 9.

It is understood that reels 48 in gaming machine 12 could be implemented under control of gaming processor 52 in electronic rather than mechanical form. Additionally, though the preferred embodiment describes a machine having separate elements for reels 48 and display 58, one would understand that such units could be combined in a single display without departing from the concepts embodied herein.

Figure 3:
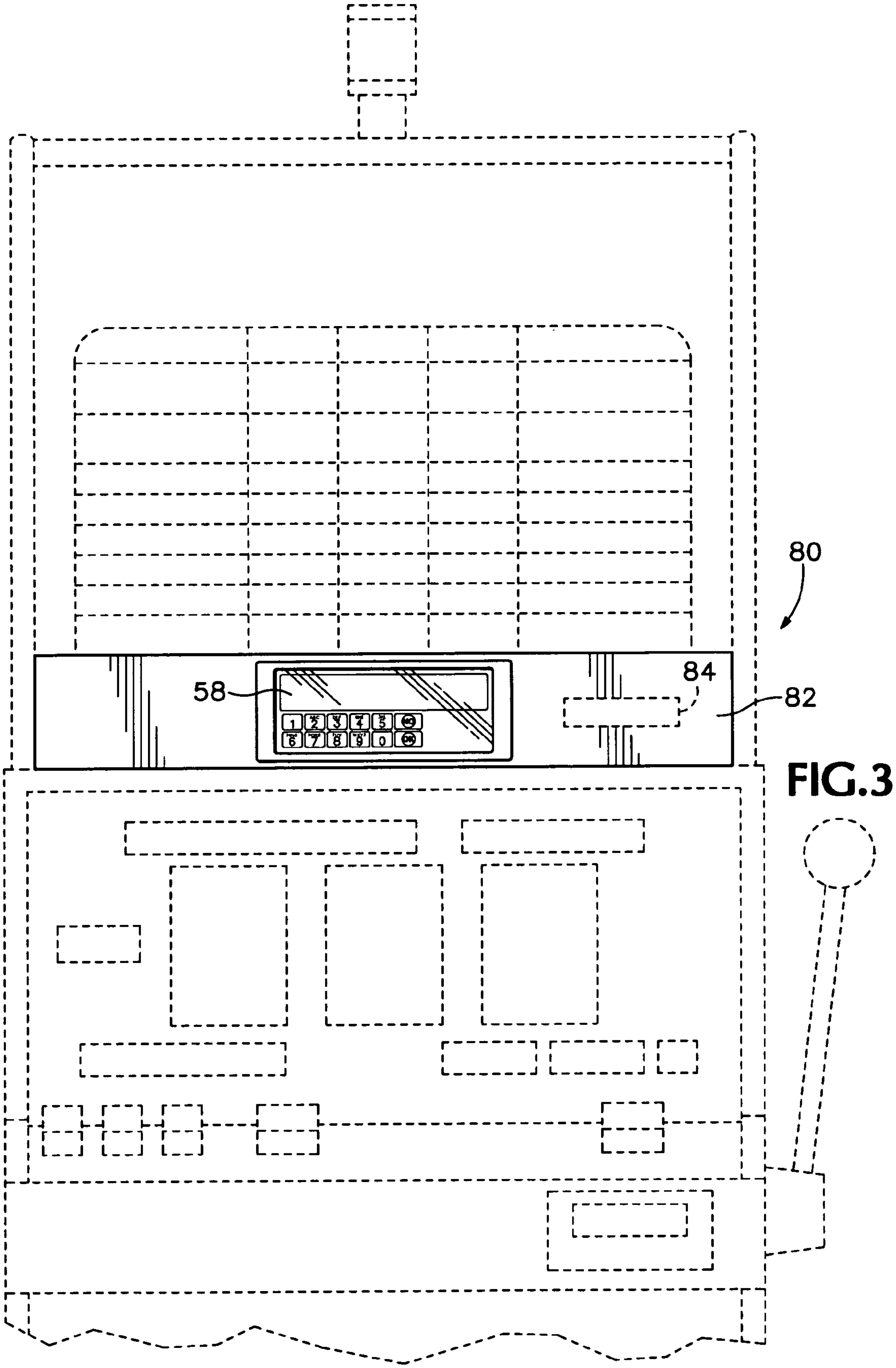
FIG. 3 is a partial view of a slot machine, shown in dashed lines, that is part of an implementation of the present embodiment of the invention, including an interactive display screen and card reader, shown in solid lines.
Figure 6:
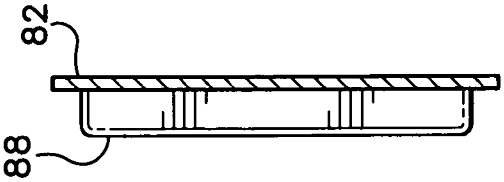
FIG. 6 is a bottom view of the display of FIG. 4.
Figure 4:
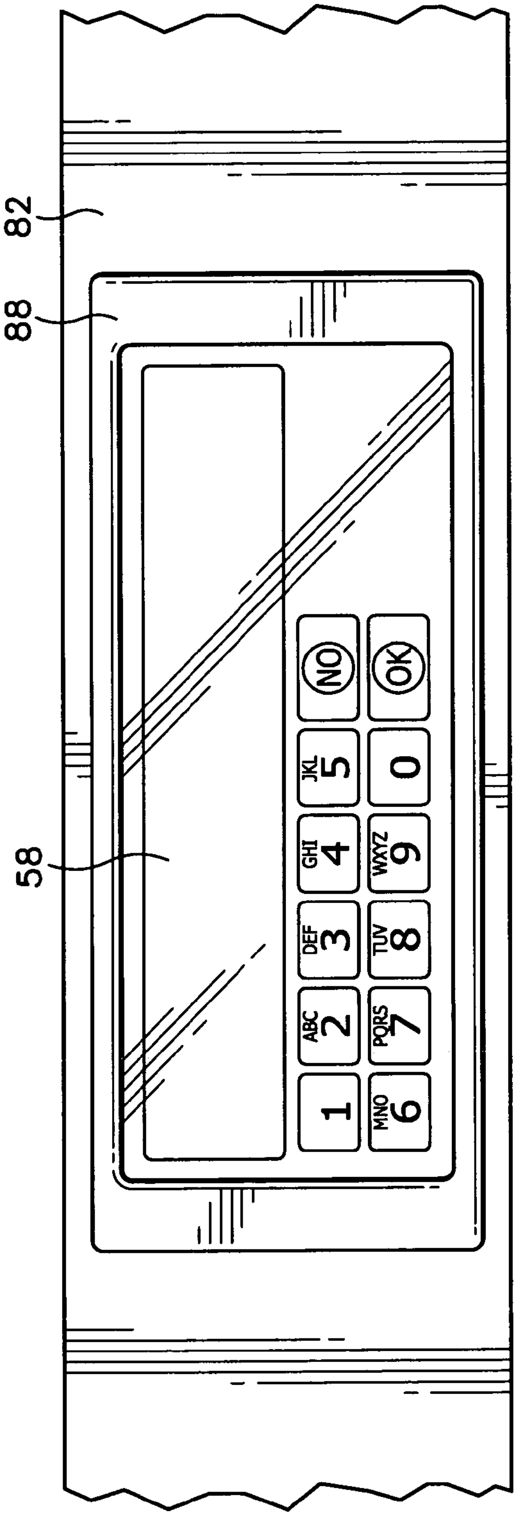
FIG. 4 is an enlarged partial view of the display of FIG. 3.
Figure 5:
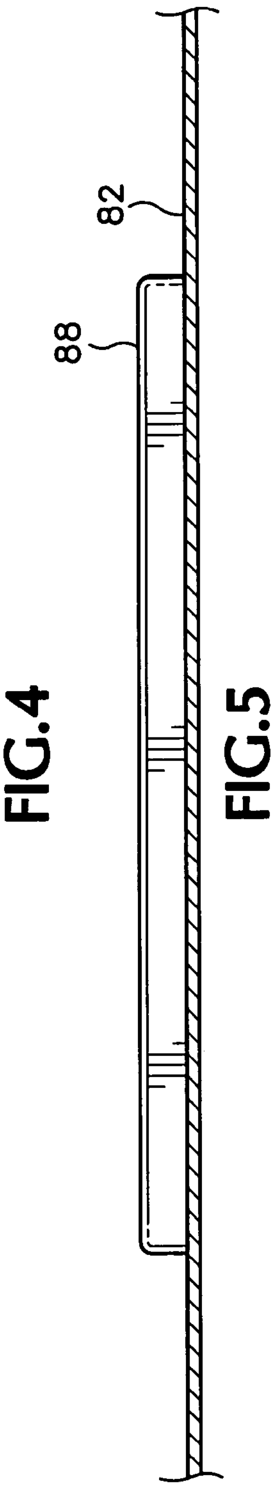
FIG. 5 is a right-side view of the display of FIG. 4.
Figure 7:
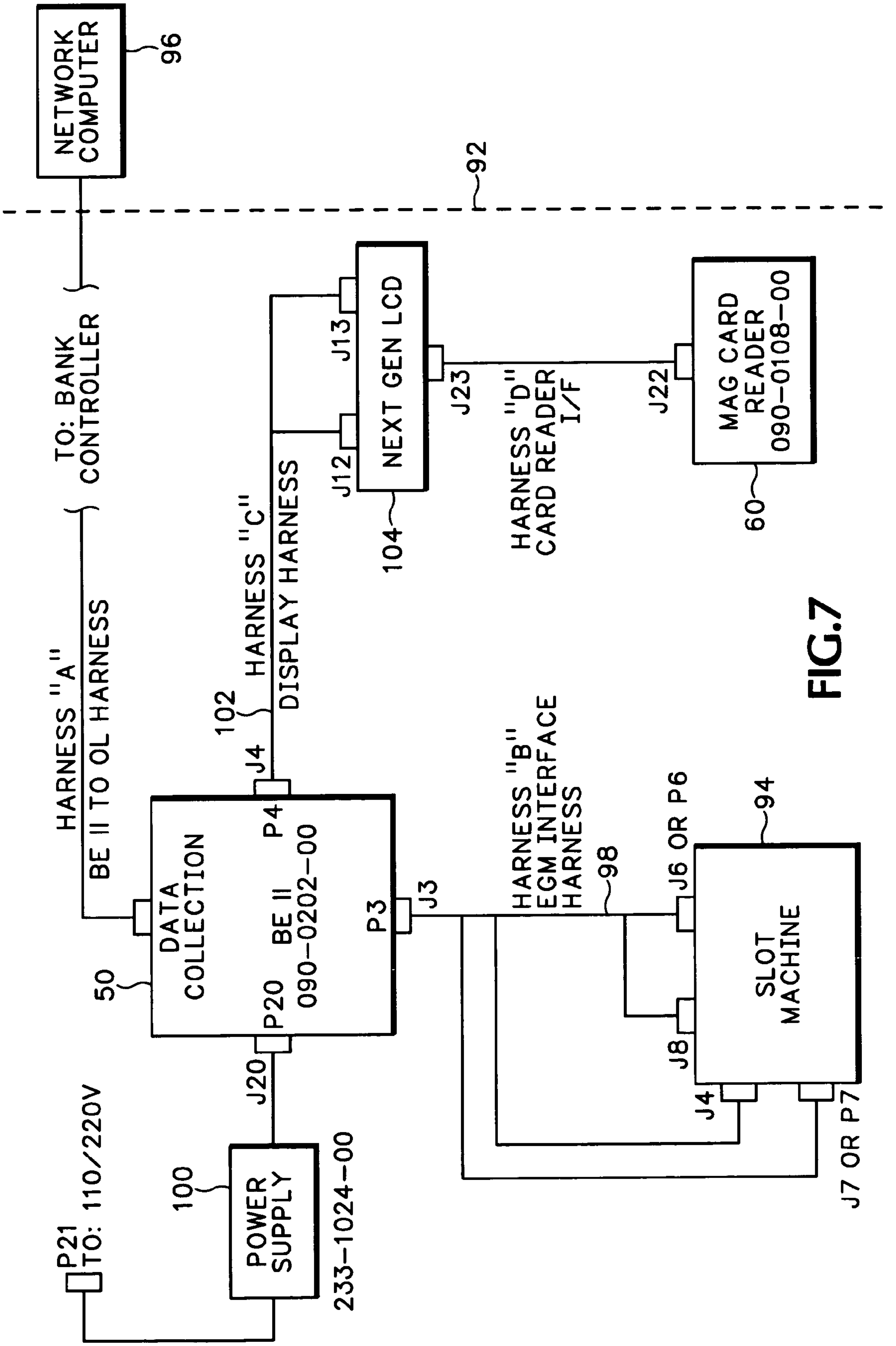
FIG. 7 is a schematic view of the slot machine display and card reader of FIG. 3 depicting the manner in which circuitry associated with each is connected to a network of similar slot machines incorporating displays and card readers.

Turning now to FIG. 7, the schematic components depicted therein on the left side of dashed line 92 are all contained within the cabinet that houses the upper portion 80 of slot machine 12 in FIG. 3. Slot machine electronics 94 is part of the original slot machine structure provided by the slot-machine manufacturer. The additional components on the left side of line 92, however, are all added to implement the invention in association with electronics 94 and the network.

The components within the slot machine, i.e., on the left side of line 92, are connected to a computer network, along with numerous additional slot machines 12, 14 having the related structure depicted in FIG. 7. The network is illustrated as a computer 96 on the right side of dashed line 92. Networked slot machines are known in the art and are depicted in the '961 and '125 patents. The network is shown generally in FIG. 1 and includes databases for storing slot machine transactions within accounting system 38 and player tracking data within player server 42, servers 44,46 for implementing system games and bonuses, and configuration work stations 40 for configuring the system games and bonuses. The network further includes a Content Manager, which is a program implemented on a network computer such as configuration work station 40 that permits an operator of the system, typically a casino, to customize and configure images that appear on display 58.

The slot-machine electronics 94 are connected to a system-machine interface (MCI) board 50 via a wiring harness 98. Board 50 provides communications between the slot machine electronics 94 and network 96 in a manner that is described in the '961 and '125 patents. A power supply 100 provides power to board 50. A wiring harness 102 connects board 50 with the display and associated electronics 104. Another harness connects board 50 to the network including computer 96. The power supply also supplies power to electronics 104 and to a card reader 60. The card reader is behind bezel 90 in FIG. 9 and includes slot 86.

Figure 8:
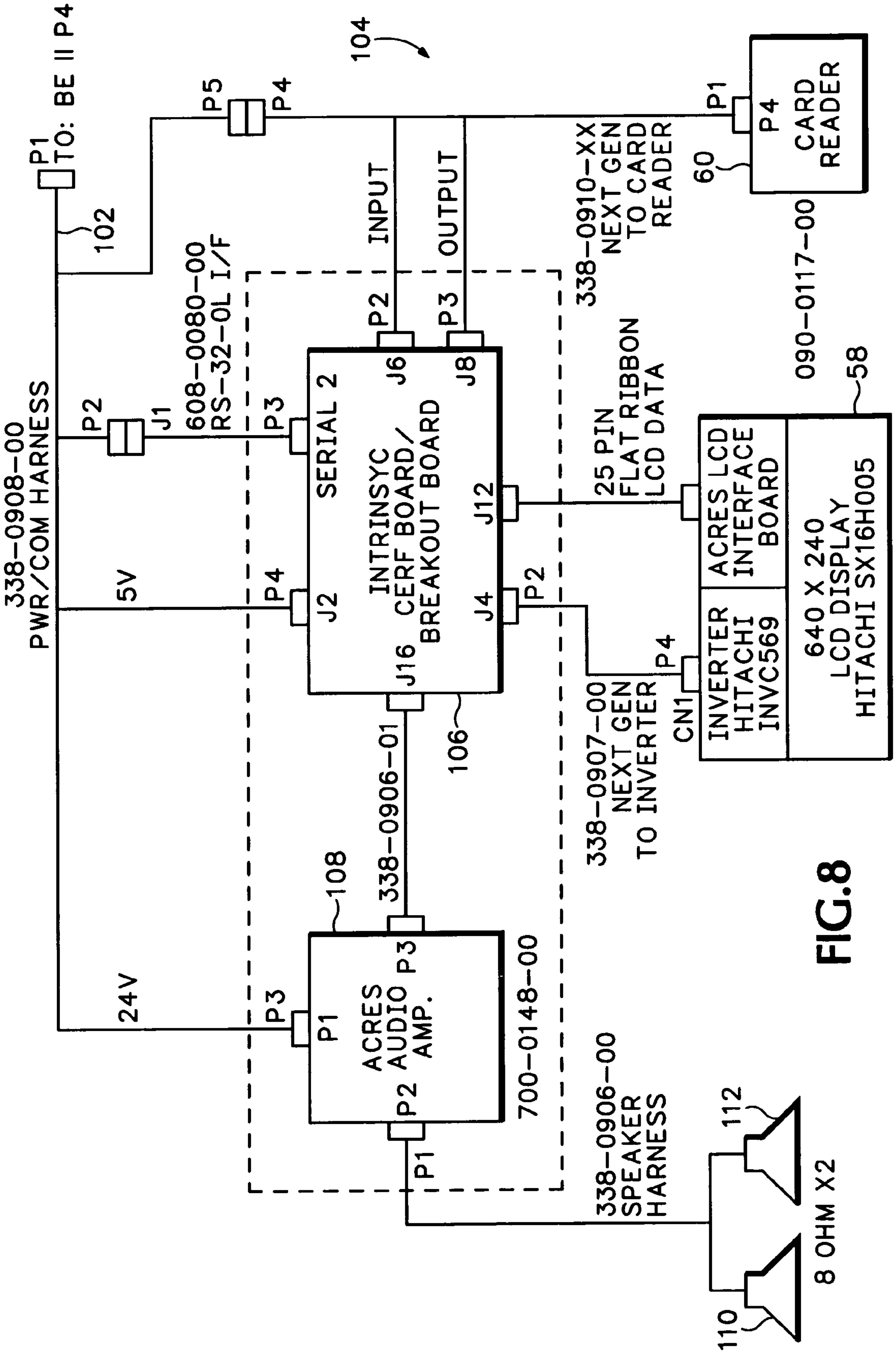
FIG. 8 is a schematic view of the display and related components of FIG. 7.

Turning now to FIGS. 8 and 9, additional details of the display and associated electronics 104 in FIG. 7 are depicted schematically.

A dedicated computer 106 includes an LCD controller and electronics for enabling VGA touch panel images and sound for LCD 58. In the present embodiment of the invention, computer 106 is a commercially available processor board manufactured by Intrinsyc. It includes an Intel ARM processor and a Windows CE operating system. Computer 106 also includes nonvolatile memory for storing images and sounds that are utilized as described hereinafter. An amplifier 108 provides sound signals to speakers 110, 112, which are partially visible in FIG. 9. It is understood that the system electronics 104 can be wired by those knowledgeable in the art to also or instead utilize the base game speakers 64 (FIG. 2) rather than just dedicated speakers 110, 112.

In the present embodiment of the invention, the networked slot machines are initially configured using the Content Manager, which—in the present embodiment of the invention—runs on the same network PC platform as configuration workstation 40 (FIG. 1), and enables files to be downloaded to the system-machine interface board, like board 50, associated with each slot machine. Once the screens and features of individual screens are selected at the Content Manager, an initialization file is created that identifies which MMC files and features have been selected. The configuration workstation 40 can then be used to download the initialization file and associated MMC files to all the machines, to groups of machines, or even to a single selected machine. These initialization files and associated MMC files are stored in nonvolatile memory in electronics 104. All parameters associated with the audio content and with display 58 can be configured in this manner.

In operation of the prior art VFD, System Tokens—such as a player's name or accrued points—are embedded in a slot-machine message comprising otherwise constant text strings that appear on the VFD. For example in the message Hello Richard, Hello comprises a constant text string and Richard comprises the System Token, here, the player name associated with the player card in use.

In the present invention, an MMC Token is embedded in the prior art VFD message, which may includes System Tokens, that is transmitted to board 50 by the network and from there to board 106. As a result, if the message is received by a slot machine with a VFD, the usual VFD message is displayed. If it is received by a slot machine with an LCD, the MMC message identified by the MMC Token is called from storage in electronics 106 and run, incorporating any System Tokens as specified in the network message. But when a VFD message that does not include an MMC Token is received at an LCD machine, the FIG. 10 emulation screen appears bearing the VFD message in the upper half, and emulating a prior art keypad, which is associated with the VFD in prior art machines. This feature permits gradual introduction of LCD machines on a network and gradual introduction of MMC messages to any LCD machines that are on the network. Multimedia content can thus be downloaded on the gaming-machine network and displayed on the LCD as described above.

Figure 10:
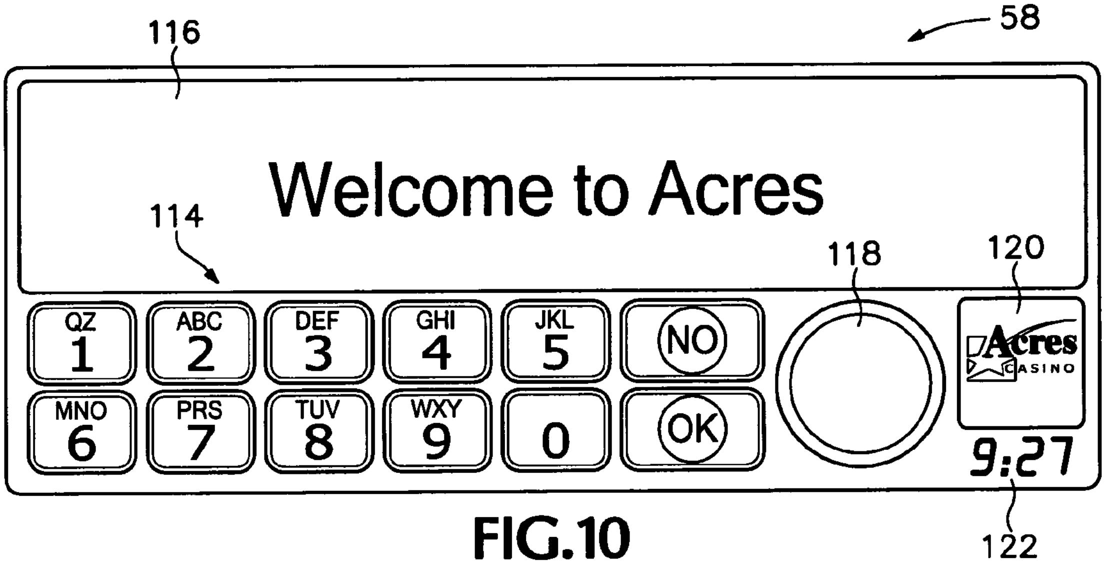
FIGS. 10-14 are enlarged views of the display screen depicted in FIG. 9 with images displayed thereon as described in the following detailed description.

In FIG. 10, display 58 is shown with an image that appears when the system emulates a prior art vacuum florescent display (VFD), like that disclosed in the '961 and '125 patents. The touch screen display image includes a keypad 114, a message screen 116, a bonus button 118, a casino logo 120, and a time display 122. Unless it is otherwise clear from the context, use of the term button herein refers to an image of a button on the touch screen, which enables a player to interact with the network by touching screen 58 over the button image. The casino operator has the option, implemented via the Content Manager, of displaying various features such as the bonus button and the system time, dependent upon the operator's preference.

Emulation mode is advantageous in two situations. First, if the touch screen display has not been configured or configured incorrectly, the image of FIG. 10 appears. Second, when prior art systems are retrofitted to include some slot machines that incorporate the touch screen LCD of the present invention and others that incorporate the prior art VFD, there may be some network display messages that are not implemented with the multimedia content ("MMC") used by LCD 58. If so, the system defaults to VFD emulation mode, in which VFD messages are displayed on message screen 116, while the player enters commands using keypad 114 and bonus button 118. In this mode, touch keypad 114 and the message panel 116 emulate the behavior of the prior art VFD and keypad, respectively.

In another embodiment of the invention, a separate network, i.e., a different network from the one computer 50 is on, is connected to board 106. This separate network provides MMC to board 106 for displaying images or playing audio. Such a network could be used to deliver real-time multimedia content to the display 58 and speakers 110, 112. In addition, this network is used to deliver real-time video, either broadcast or closed circuit, to the display while play is ongoing. The keypad image on the touch screen display is used by the player to select a broadcast or closed-circuit channel. This configuration could permit a player to watch, e.g., a sporting event or other show while gaming.

Figure 11:

FIG. 11 depicts an example of display 58 in idle-attract mode, i.e., when there is no player card inserted in slot 86. When there is no card, the system displays up to 32 full size screens in a repeating sequence. Using a computer and keyboard on the network, the operator can control the duration, time of day, and sound associated with the idle-attract mode.

Figure 12:
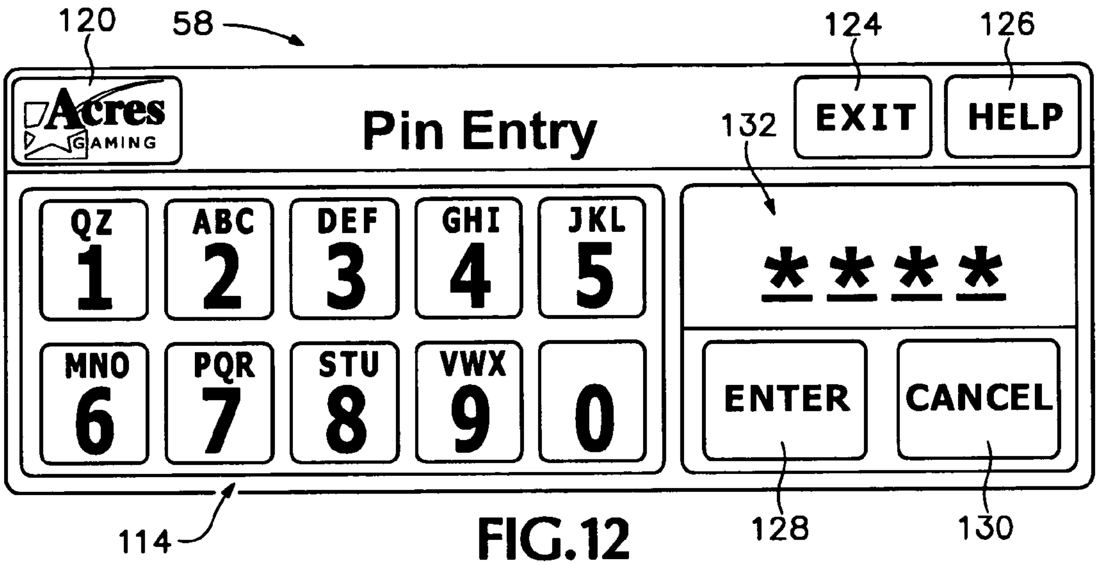
Figure 13:
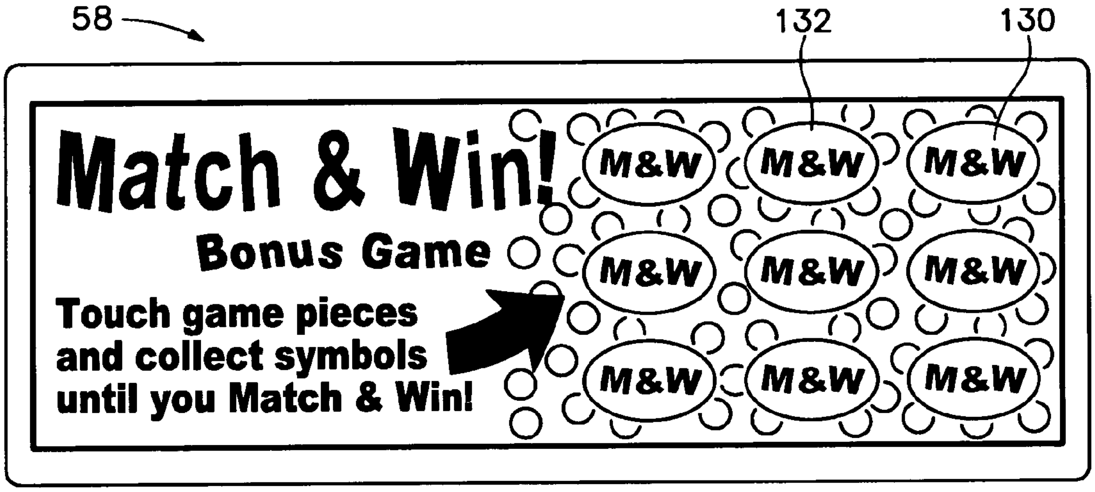
Figure 14:
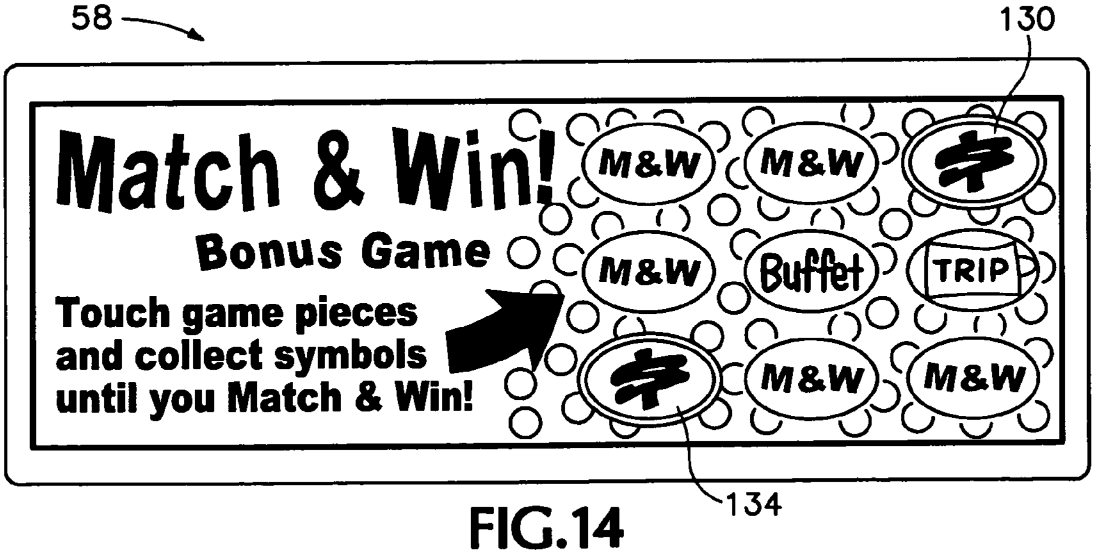

Turning to FIG. 12, the display is shown as it appears after a player enters his or her card into slot 86 of the card reader. This display includes a title, Pin Entry, PIN being an acronym for Personal Identification Number, a number that is stored on the network in association with the player's account. Also included is a casino logo 120, in the present embodiment of the invention, the logo of the assignee being utilized for illustrative purposes. In the upper right-hand corner of the display are an Exit button 124 and a Help button 126. Exit button 124 permits the player to cancel current operations or to move back to the previous screen. In FIG. 12, if Exit button 124 is pressed, the system resumes the idle-attract mode of FIG. 11. Pressing Help button 126 retrieves up to 8 screens of help information that can be configured on the Content Manager software.

The display of FIG. 12 also includes a touch keypad 114, a touch Enter button 128, a touch Cancel button 130, and a PIN entry field 132, which displays an asterisk each time a digit from the player's PIN is entered on keypad 114.

In operation, when a player enters his or her card into slot 86, the FIG. 12 image appears on display 58. The player enters the PIN associated with the player card by pressing the digits on keypad 114 and hitting Enter button 128. The Content Manager can be used to change the number of PIN digits required. There is also an auto enter feature that can be implemented at the Content Manager that sends the PIN to board 50 without waiting for the player to push the Enter button.

To induce the player to use the card, the casino awards each player points proportional to the money wagered by the player. Players consequently accrue points at a rate related to the amount wagered. The points are displayed on display 58. In prior art player tracking systems, the player may take his or her card to a special desk in the casino where a casino employee scans the card to determine how many accrued points are in the player's account. The player may then redeem points for selected merchandise, meals in casino restaurants, or the like, which each have assigned point values.

Figure 15A:
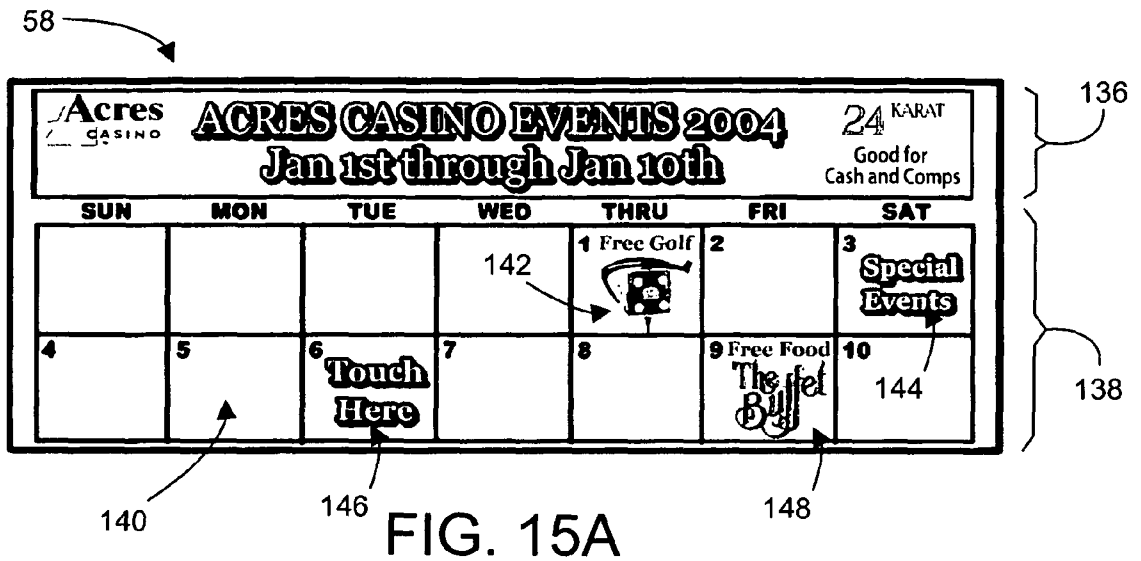
FIGS. 15A-15C illustrate calendar displays having rotating event graphics depicted on the display screen according to a preferred embodiment of the invention.
Figure 15B:
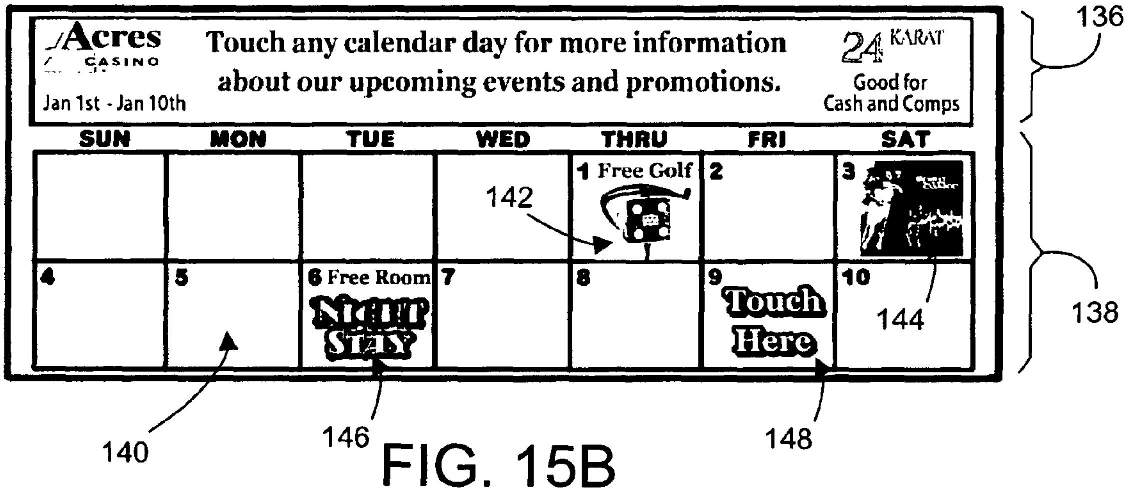
Figure 15C:
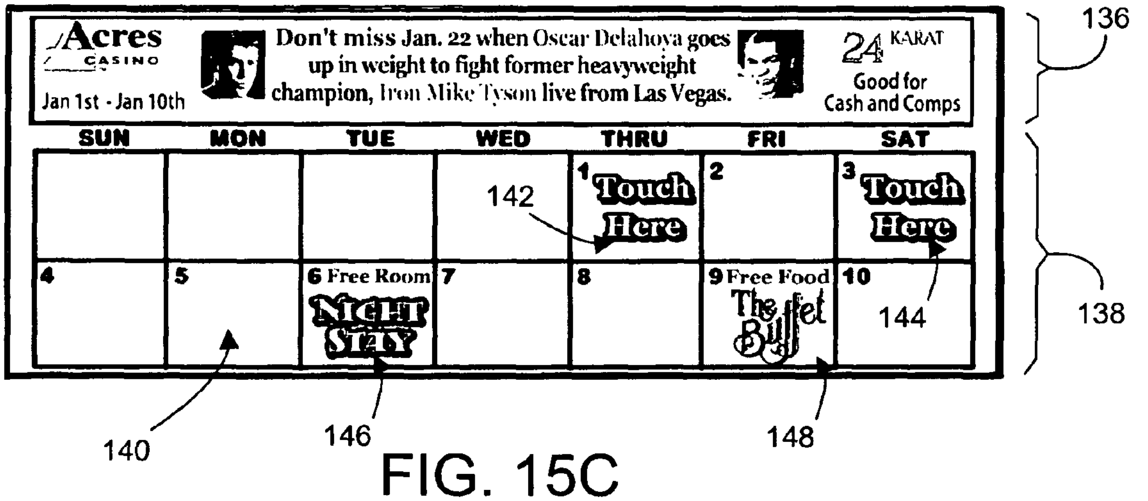

Such promotional items are displayed on display 58 for selection and redeemable according to the practices of the invention as shown in FIGS. 15A, 15B and 15C. The screens are implemented as a collection of graphic images sent through the gaming network to gaming machine 12 by the Content Manager program operating on configuration workstation 40 (FIG. 1). The display images implemented according to a preferred embodiment of the invention include a banner promotional image 136 displayed along a top row of display 58 and a calendar display field 138 displayed under banner image 136. The images can of course be shown anywhere on the display but the following is simply included as a preferred implementation.

The present invention integrates the concepts of interactive player based promotions and calendar tracking that utilize a touch screen display on a gaming system associated with a remote player tracking system. The promotions and calendar events can be configured at a remote configuration workstation by selecting system criteria defining the particular bonus promotion.

A graphic or series of graphics are displayed on a gaming machine informational display 58 such as an Acres NexGen display, or on any video electronic gaming machine (EGM) that is connected to a casino management system, such as the Acres system. The graphics are calendars containing boxes that represent the days of the month, much like any paper calendar. There is also a title area that shows the range of the calendar and has room for events that span the entire range of the calendar. Within each day box, the casino can graphically advertise future casino events, promotions, general casino gambling, and bonusing opportunities scheduled or occurring on those specific days. We will refer to all of these things collectively as items in the text.

Multiple items can be represented in a single day box by animating the graphics, so that the player sees a rotation of items in the day boxes of the calendar. Players are prompted through calendar graphics and sound to "touch the day or item of interest", which causes the display to expand to a full screen detailed graphic of the day and/or item. After the player has read the content, he will time-out or press a button to return to the calendar screen. From there he can touch another day of interest.

The calendar can play in several contexts, each with different content (graphics and sound) if desired. When the EGM is idle (no player), content can refer to generic items available to all customers in a casino. When the EGM is played by a player with no club card, content can be shifted to prompt him to become a club card member. As an example, the calendar could advertise a promotional "sign up day" every Tuesday.

When the player tracking system detects that a carded player is playing the EGM, the calendar content can become highly specific to that player, using information about the player provided by the tracking system databases. Items such as player-specific bonuses/events/participation/status, player history, ranking, preferences, etc. can be displayed on the player-specific calendar. When a player has selected a day for detailed examination, an event message can be generated by the display or the EGM that travels through the gaming network, resulting in an alert to a terminal or pager, notifying casino personnel that may want to follow up on player interest with personal interaction.

The images, information and features shown on display 58 are preferably linked to the player record stored in player database 43 (FIG. 1) of the player identified by pin number and/or player tracking card. The record may reflect, for instance, the player's preferences for certain promotions. The calendar display field 138 in FIG. 15A, for instance, shows a ten day period with calendar boxes 140 shown for each day. A set of four promotions are displayed within respective boxes 140: a free golf promotion within the calendar box associated with Jan. 1, 2004; a special event promotion for tickets to a show occurring January 3; a room rate reduction or free night for January 6; and a free or discounted buffet for January 9. The other calendar boxes are currently empty as no promotions are being offered for selection by the players on those days.

FIGS. 15A through 15C show progressive screen images on display 58 implemented as a rotating display items. The graphics driver operating display 58 updates the image every set number of seconds and/or runs video graphics on the display. In FIG. 15A, for instance, the free golf icon is shown within the January 1 day box 142. A set number of seconds later, display 58 is updated to show the image shown in FIG. 15B. The same free golf icon is shown in box 142. Still another set number of seconds later, display 58 is again updated to shown the image in FIG. 15C. The free golf icon has now been changed to a touch here icon to prompt the player to touch that day box space 142 to select the promotional item.

It will be appreciated that each of the promotional items can have selection prompts such as the touch here icon. For the January 3 day box 144, the image rotates between a general special event icon, then a more specific special event icon showing the special event in question, and finally a touch here icon before again rotating back to the general special event icon. For the January 6 day box 146, the image starts with a touch here icon and thence to two time sessions of the free room promotional icon. Finally, the January 9 day box 148 rotates between a free food icon, then the touch here selection prompt icon, and back to the free food icon.

It will also be appreciated that one method for displaying multiple promotions on the calendar would be to offset the selection prompt icons. The free room selection prompt ("Touch Here") in day box 146 is shown in connection with FIG. 15A, the free food selection prompt in day box 148 with FIG. 15B, and the special event selection prompt in day box 144 and free golf prompt in day box 142 with FIG. 15C.

It will further be appreciated that the banner promotion space 136 also changes between display screens FIG. 15A through FIG. 15C. The display images can again be tied to preferences noted within the player database so, for instance, fight information (such as that in FIG. 15C) could be displayed to players who have expressed an interest in boxing while other promotions can be displayed to those players expressing other preferences. Preferences can be collected based on prior promotional selections, so that consistent selection of the free food promotion may indicate a preference for meals, and/or based on registration information and preferences indicated by the player upon sign up for the player tracking card.

Figure 16:
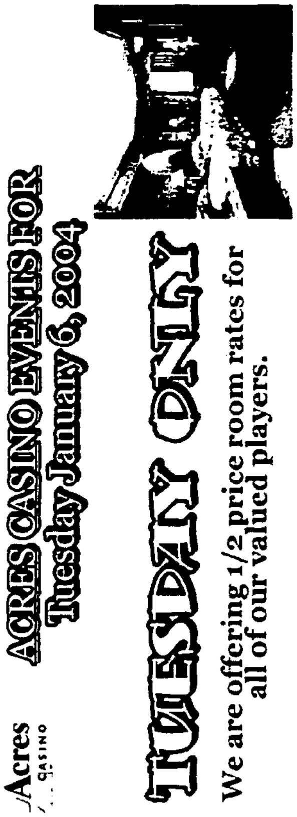
FIGS. 16-19 are screen images displayed on the display screen of FIG. 9 resulting from player selection of some of the calendar event boxes shown in FIGS. 15A-15C.
Figure 18:
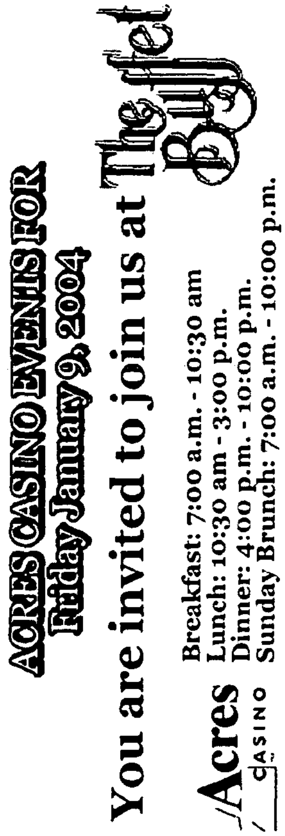
Figure 19:

Selection of the promotion occurs by a player physically touching the day box associated with the particular promotion desired on the touch-screen display 58. Selection of day box 146 for the free room promotion, for instance, may bring up the screen graphic shown in FIG. 16. Similarly, selection of day box 148 for the free food promotion may bring up the screen graphic shown in FIG. 18. And selection of day box 142 for the free golf promotion may bring up the screen graphic shown in FIG. 19. Although not shown, player selection of the promotion can bring up other screens allowing confirmation of the time (e.g. golf tee times) which can then tie in to the golf course reservation system. Similarly, room reservations can be confirmed by tying to the hotel reservation system associated with the casino operating the gaming machines or associated with the promotion.

Figure 17:
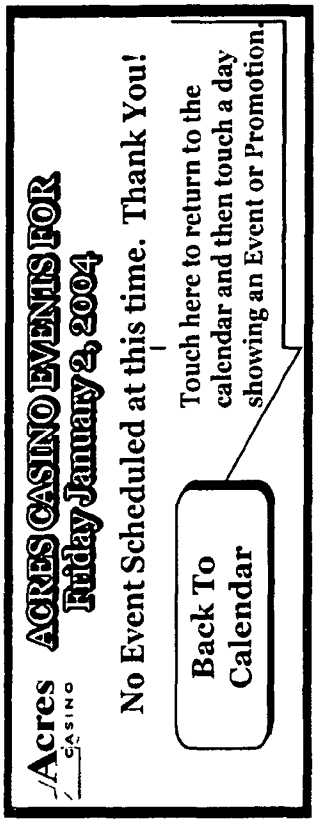
Figure 20:
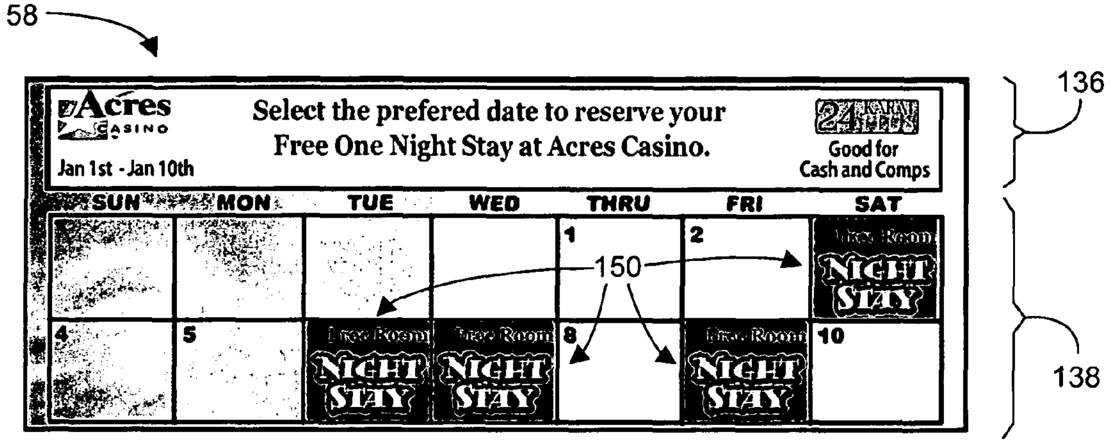
FIGS. 20-37 are screen images displayed on the display screen of FIG. 9 resulting from alternate promotional events implemented according to the invention.

Other promotions and events are of course possible. As FIG. 20 illustrates, the calendar 138 can highlight a range of days 150 with a promotional message displayed in upper display field 136 prompting a player to select on of the days to receive the promotion, here a free night's stay at the casino hotel. In the example shown in FIG. 20, the days highlighted by the system for selection are Saturday January 3, Tuesday January 6, Wednesday January 7, and Friday January 9. The days highlighted can coincide with days that the casino/hotel wants to drive business to the hotel; for instance, days of low occupancy. Alternately, the highlighted and presented for selection by the player can coincide with preferences included in the player tracking record, or, in the case of special events, to occur while the player is known to be staying at or near the hotel. The player record may for instance include a noted preference that the player is never interested in playing golf during weekdays. Only weekend days would then be highlighted for selection. After the player selects a day on the calendar, a message box appears (not shown) with the option to commit or cancel. Once the player commits, that day becomes a free night stay and all other highlighted days turn normal. Selection of a day outside the range presented, for example selecting the day box associated with January 2 in FIGS. 15A-15C where the presented range for the special event promotion is January 3-January 5, would result in display of the image shown in FIG. 17 prompting the player to chose another day.

Figure 21:
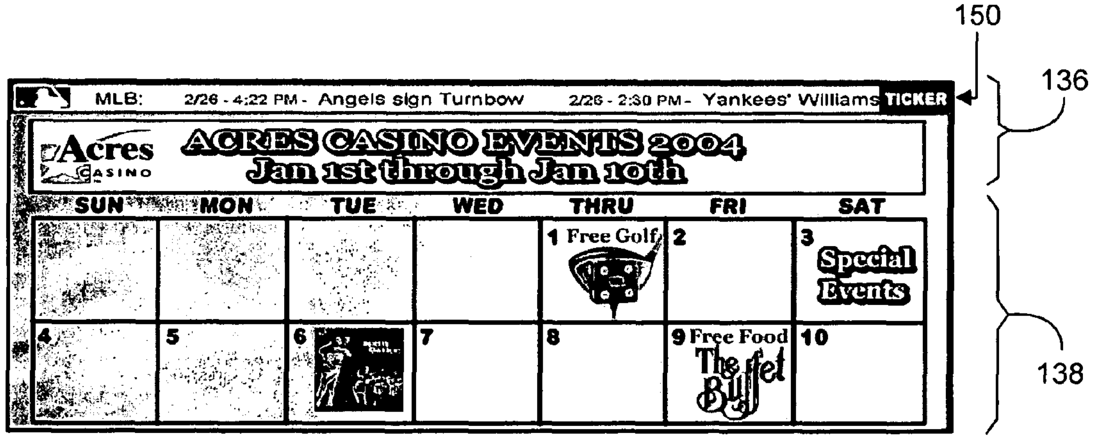

In another feature, and as shown in FIG. 21, a ticker-style message 152 is located within the display window 58, as at the top portion of the calendar with sports scores, casino events, schedule changes, cancellations, etc. The messages displayed on the ticker can coincide with preferences included in the player tracking record—for instance, teams or events that the player is known to follow or bet on. The player betting record can be comprehensively tied together so that the player feels free to game and an EGM while being continuously updated on teams that he or she has bet on in the sport's book.

Figure 22:
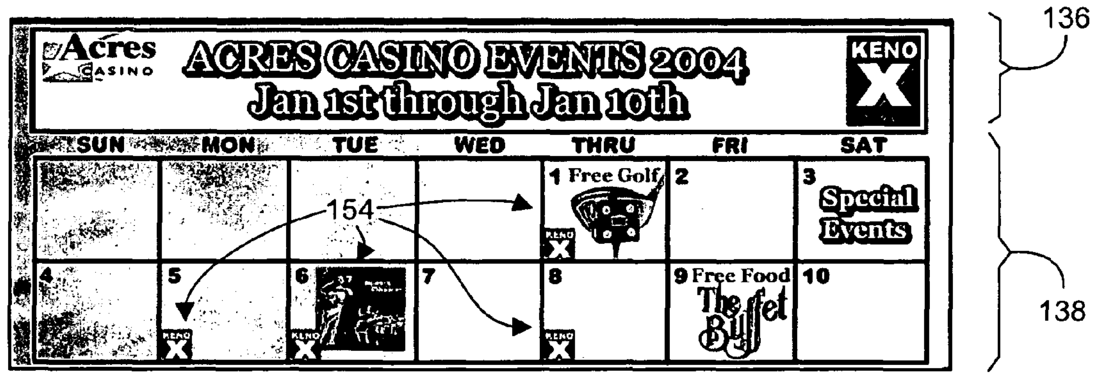

Another promotion, shown in FIG. 22, is configured to operate like a keno-style game using the calendar days played at a particular machine, bank of machines, or casino. For each day a player uses a card and touches that day on the calendar 138, for instance, that day becomes a selected keno square 154. At the end of each month, the casino randomly picks x number of keno squares. The player will win a bonus amount according to the number of matches. In the example shown, for instance, the player is shown to have played on the days of January 1, 5, 6 and 8. Each date would then receive a keno mark, as shown, and be available for selection by the end-of-month keno-type day selections. The more days matched with the selected days, the more the player wins.

Figure 23:
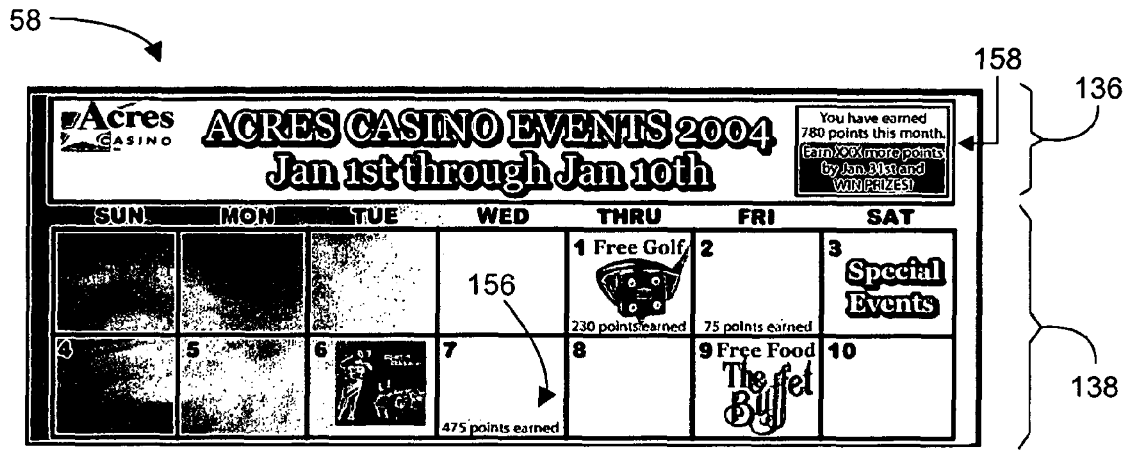

In yet another promotion, illustrated in FIG. 23, player points are accumulated over a certain number of calendar days. Each day that a carded player plays, the points accumulated for that calendar day are stored and displayed at the bottom of the day square 156. According to a preferred operation of the promotion, the player would have a certain number of days to accumulate a predetermined number of points (goal) to win a casino promotion prize. A message indicating the player's points earned and points remaining for a win are displayed within the screen display 58 in message box 158.

The more points the player accumulates over the predetermined goal, the more prizes won. In the example shown, for instance, the player has earned a current total of 780 points summed from the total of 230 points earned January 1, 75 points from January 2 and 475 points earned January 7. The promotion calls for a certain number (e.g. xx) of points to be accumulated and displays for the player the total remaining (e.g. xxx) that needs to be won before the prize is won.

Figure 24:
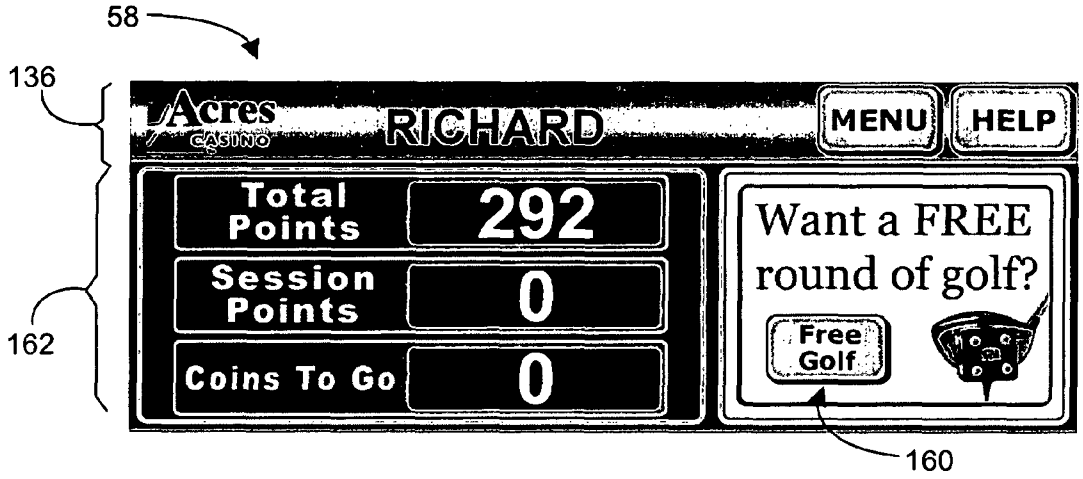

In another operation, shown in FIG. 24, a player could be sent player audiovisual alerts within the session attract area of screen 58. The alert would display a brief promotion advertisement, such as a free round of golf, with a touch-screen button 160 to enter the calendar. Other gaming criteria can be shown in a player point display area 162 reflecting the total points won, the points won in the current session and the coins to go before a prize is awarded. Here, the prize (free golf) is being awarded since the "coins to go" space reflects a zero number.

Figure 25:
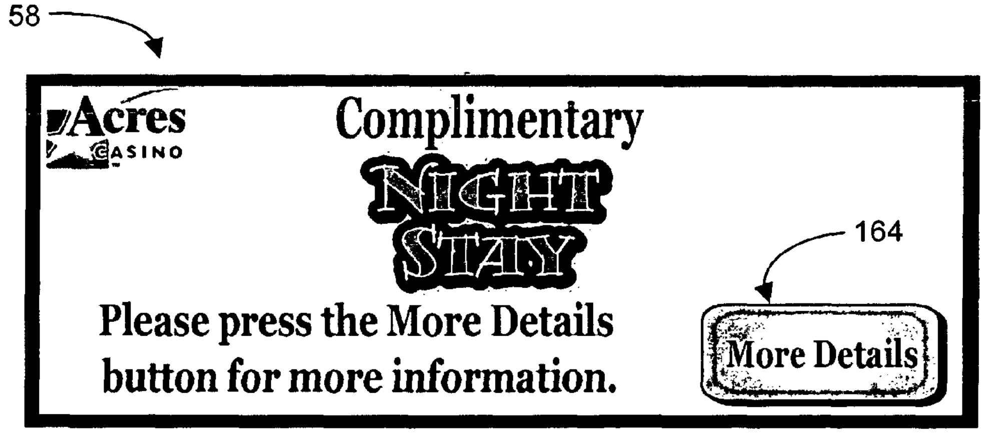
Figure 26:
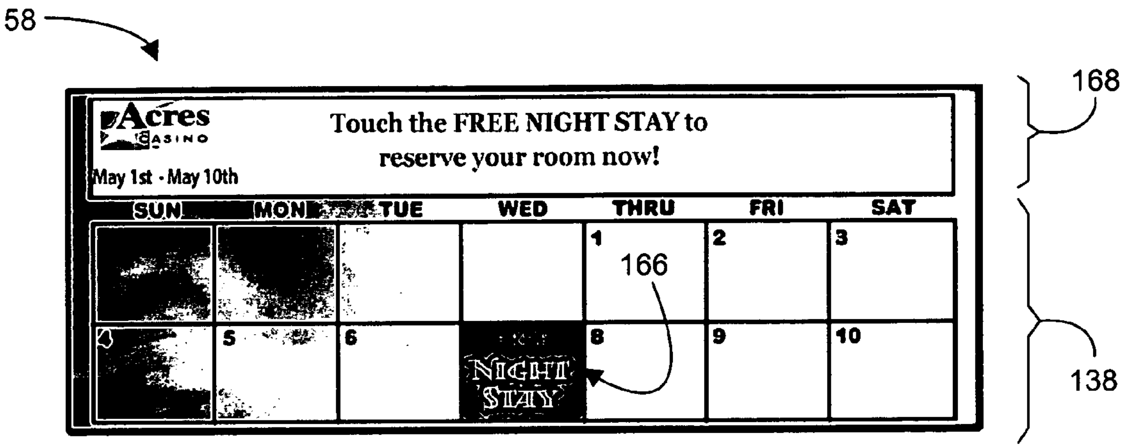
Figure 27:
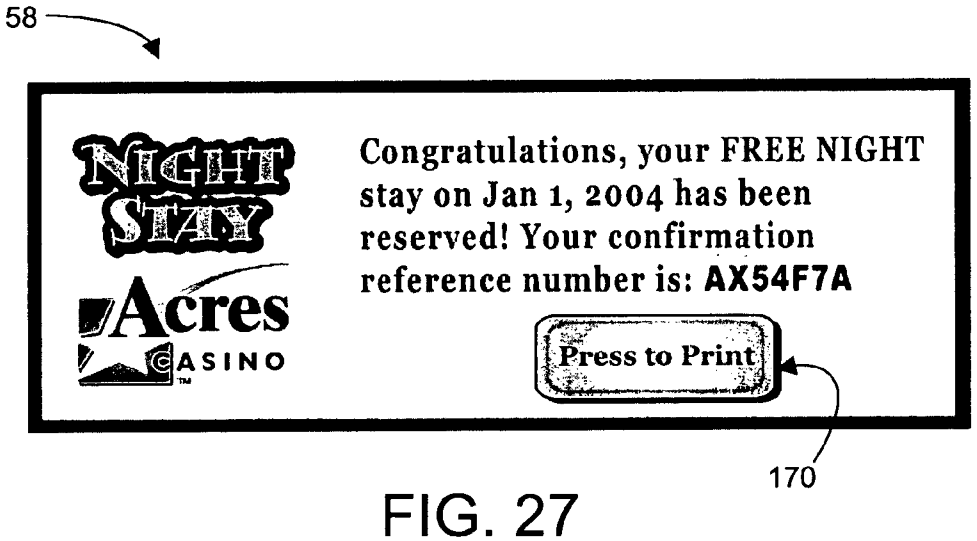

FIGS. 25-27 illustrate screen shots shown on display 58 illustrative of a promotion involving a free night's stay at the hotel/casino. In FIG. 25, a notification of a complimentary stay is displayed to the player with a touch-screen button 164 to enter the calendar. The resulting calendar 138 in FIG. 26, showing the complimentary night as an entry 166 thereon (May 7), is then displayed to the player with a message in message window 168 instructing the player to touch entry 166 to reserve the room. Touching the entry 166 touch-screen button causes the display to display the image shown in FIG. 27 in which a confirmation message is displayed together with a confirmation reference number for the reservation. Pressing the touch-screen display button 170 causes the confirmation information to print at a printer (not shown) as on an attached ticket printer.

Figure 28:
Figure 29:
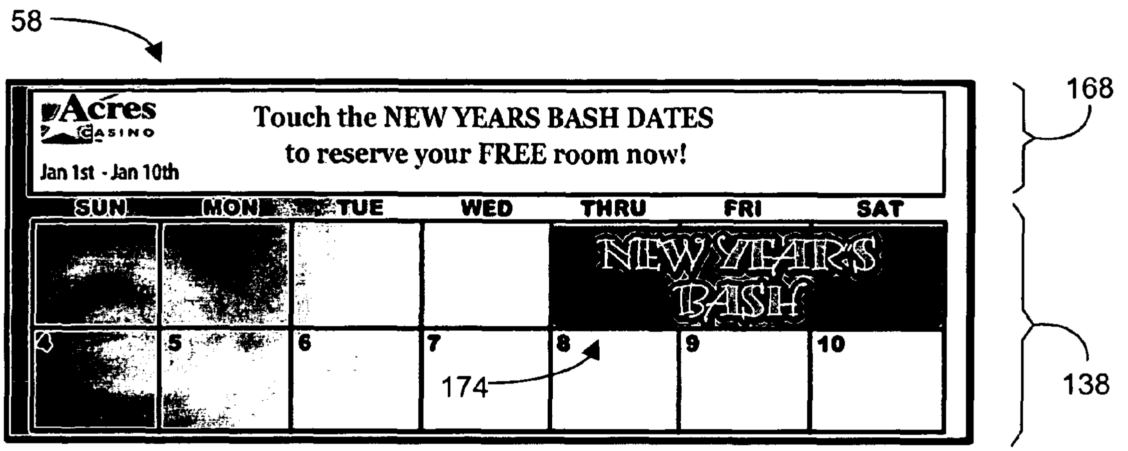
Figure 30:
Figure 31:
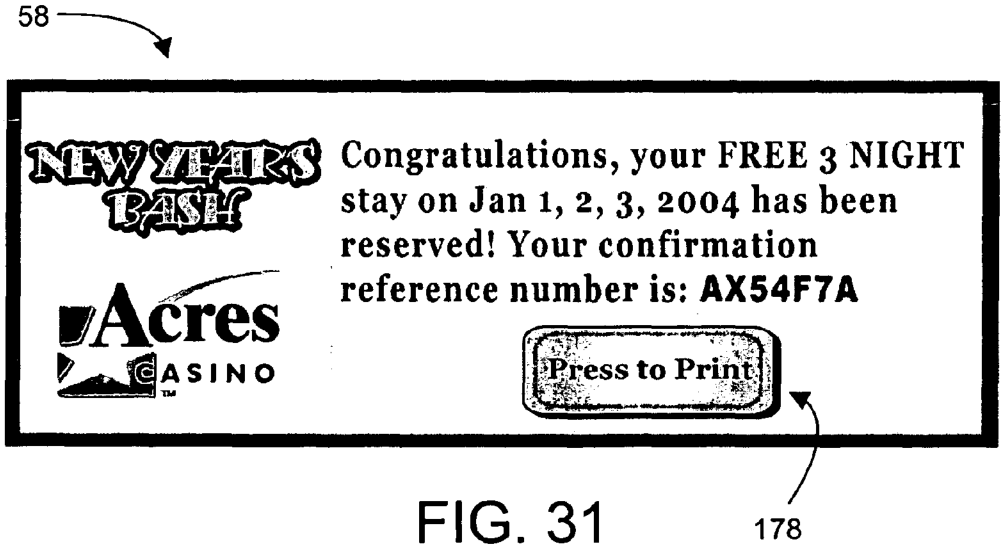

FIGS. 28-31 illustrate screen shots shown on display 58 illustrative of a promotion involving a series of free nights starting from a preset time period. In FIG. 28, a notification of a complimentary stay is displayed to the player with a touch-screen button 172 to enter the calendar. The resulting calendar 138 in FIG. 29, showing the complimentary "New Years Bash Dates" as an entry 174 thereon (January 1-3), is then displayed to the player with a message in message window 168 instructing the player to touch entry 174 to reserve the room. Touching the entry 174 touch-screen button causes the display to the display the image shown in FIG. 30 in which a confirmation message with button 176 is displayed for acceptance of the offer. Pressing the touch-screen display button 176 causes the confirmation information to be displayed in FIG. 31 with a print button 178 to print the information at a printer (not shown) as on an attached ticket printer.

Figure 32:
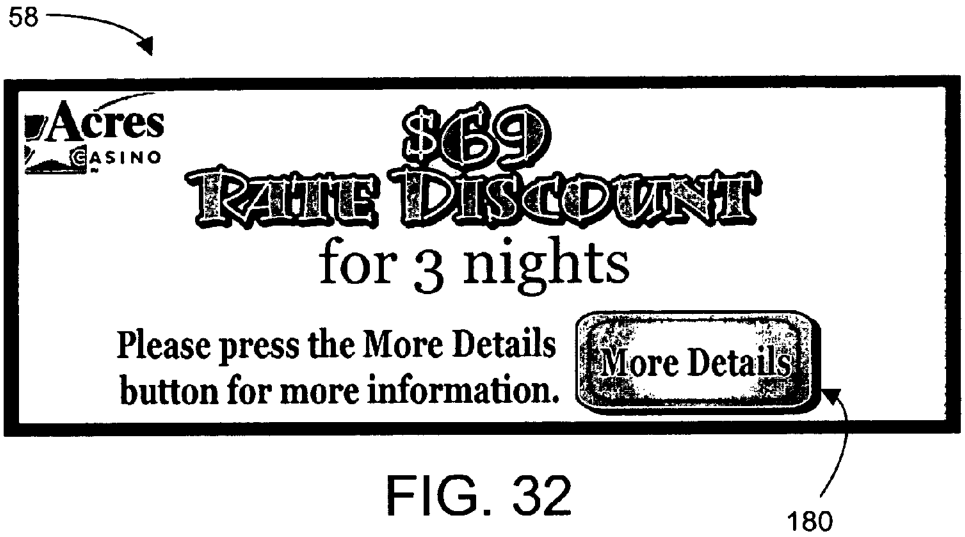
Figure 33:
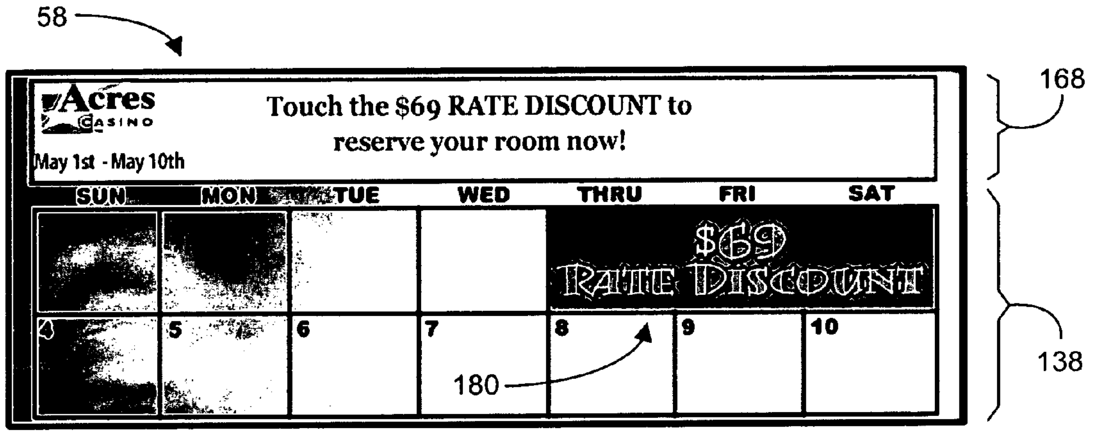
Figure 34:
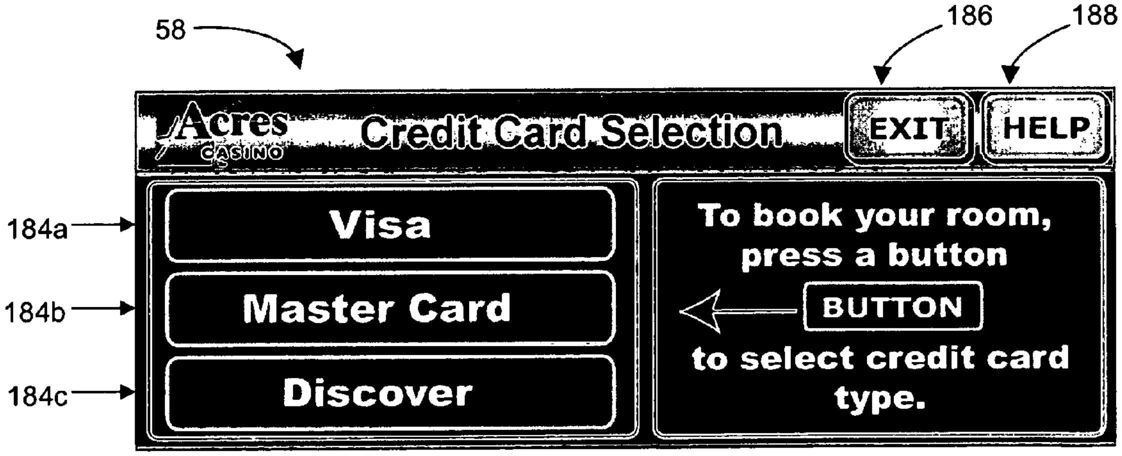
Figure 35:
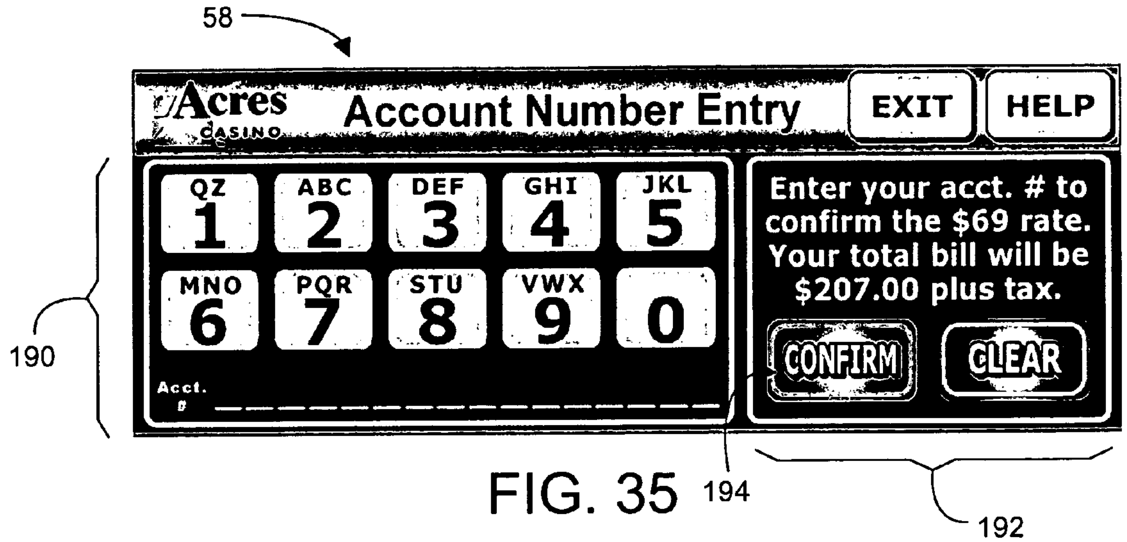
Figure 36:
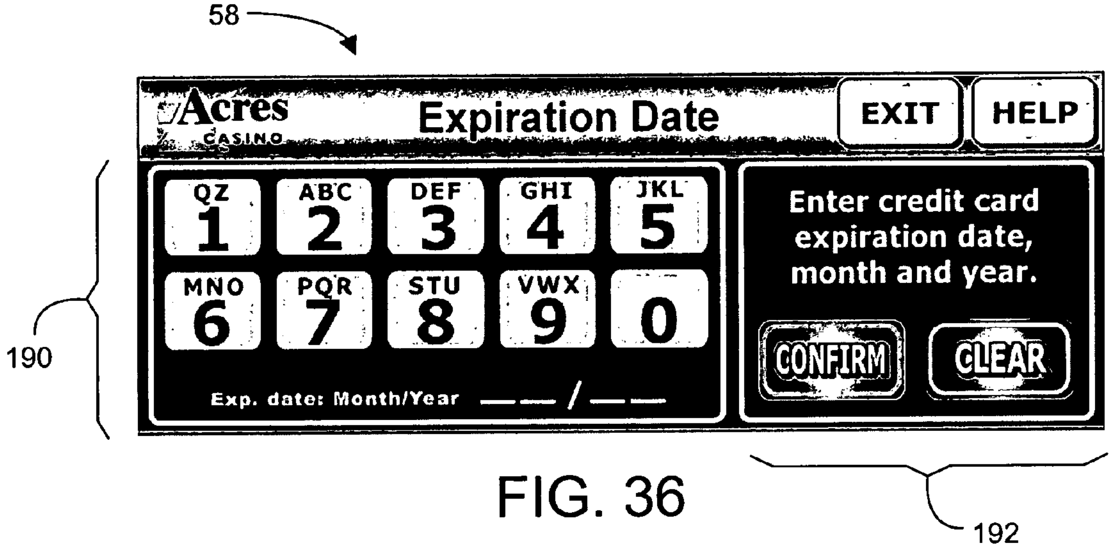
Figure 37:
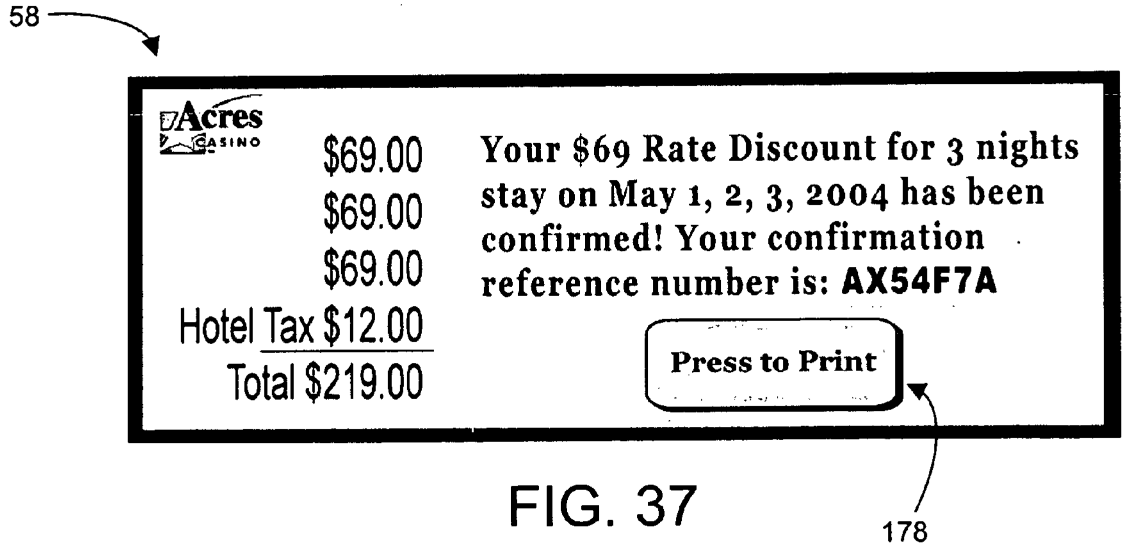

FIGS. 32-36 illustrate screen shots shown on display 58 illustrative of a promotion involving discount, and not free, room offers. In FIG. 32, a notification of a complimentary stay is displayed to the player with a touch-screen button 180 to enter the calendar. The resulting calendar 138 in FIG. 29, showing the discounted "$69 Rate Discount" as an entry 182 thereon (May 1-3), is then displayed to the player in FIG. 33 with a message in message window 168 instructing the player to touch entry 182 to reserve a room during the days displayed for the rate shown. Touching the entry 182 touch-screen button causes the display to the display the image shown in FIG. 34 in which a credit card selection is made by touching the appropriate button 184*a*-*c*. Exit 186 and Help 188 buttons are also shown. Pressing the touch-screen display button 184*a*-*c* causes the Account Number Entry display screen in FIG. 35 to appear on display 58. The player would enter the credit card number used for payment and reservation of the discounted room using touch-screen keypad 190. A confirmation of the total room rate is shown in message box 192 adjacent the entry fields. Once the card number is entered using keypad 190, and the 'confirm' button 194 in field 192 is selected, the display moves to show the Expiration Date page in FIG. 36. The player is instructed in data field 192 to enter the appropriate expiration date of the credit card selected in a previous step using the keypad 190. Completion of the previous steps results in display of a confirmation page in FIG. 37 in which all relevant reservation and pricing information is displayed for printing using print button 178 to print the information at a printer (not shown) as on an attached ticket printer.

Having described and illustrated the principles of the invention in a preferred embodiment thereof, it should be apparent that the invention can be modified in arrangement and detail without departing from such principles. We claim all modifications and variation coming within the spirit and scope of the following claims.

What is claimed is:

1. A promotions apparatus operable over a network in conjunction with a gaming machine, said promotions apparatus including:

a configuration workstation coupled over a network to the gaming machine, said configuration workstation in communication with a modeling parameters database configured to store modeling parameters and data comprising conditions that when satisfied allow one or more promotions to be generated, said configuration workstation configured to automatically generate one or more promotions in accordance with information stored in said modeling parameters database, said configuration workstation configured to store said generated one or more promotions in a promotion database, said configuration workstation including a content manager program operable to transmit one or more of said promotions over the network to the gaming machine including a calendar day associated with each promotion, at least one of said generated promotions being specific to a player at the gaming machine;

touch screen display means on the gaming machine operable to display a calendar screen image having a plurality of day boxes including a calendar day associated with each promotion, with the promotions received from the configuration workstation being displayable in associated calendar day boxes, the calendar screen image displaying the at least one player-specific promotion;

the display means on the gaming machine allowing a player to make a selection of a day box associated with a promotion and displayed on the display means; and means for implementing the selected promotion responsive to the selection by the player.

2. The promotions apparatus of claim 1, the display means further being operable to rotate promotions within a single day box if more than one promotion is associated with the same day box.

3. The promotions apparatus of claim 1, a promotion being associated with more than one day and said display means displaying said promotion for selection in the plurality of day boxes associated with the promotion.

4. The promotions apparatus of claim 1, further including:

a player database including records of player-preferred promotions for each player;

means at the gaming machine for detecting a player identity; wherein said content manager program is adapted to transmit a player-preferred promotion associated with the detected player identity to the gaming machine where it is displayable in a calendar box at the gaming machine responsive to the detected player identity.

5. The promotions apparatus of claim 1, wherein said means for implementing a promotion responsive to the selection includes means for coupling the promotions apparatus with a hotel reservations system in order to allow the player to reserve a hotel room.

6. The promotions apparatus of claim 1, wherein said means for implementing a promotion responsive to the selection includes means for coupling the promotions apparatus with a golf reservation system in order to allow the player to reserve a tee time.

7. A method for operating networked gaming devices comprising:

configuring a plurality of promotions at a configuration workstation coupled over a network to a plurality of gaming devices, said configuration workstation in communication with a modeling parameters database configured to store modeling parameters and data comprising conditions that when satisfied allow one or more promotions to be generated, wherein configuring the plurality of promotions comprises automatically generating one or more promotions in accordance with information stored in said modeling parameters database and storing said generated one or more promotions in a promotion database, at least one of said generated promotions being specific to a player at the gaming machine;

permitting a player to play one of the gaming devices, each of said gaming devices having a touch screen display;

transmitting information about the promotions over the network to the gaming devices for display;

displaying within the touch screen display a calendar comprised of a plurality of day boxes with a promotion associated with at least one of the day boxes, at least one of the day boxes being associated with the at least one player-specific promotion;

communicating information to the player about the promotions via the touch screen display associated with a gaming device;

accepting a communication from the player via the touch screen display indicative of a player selection of a promotion displayed in one of the day boxes; and implementing the selected promotion responsive to the player selection.

8. The method of claim 7 further including:

determining the identity of the player at a particular one of the gaming devices;

accessing a player account associated with the identified player to determine player preferences; and displaying player selectable promotions to the player based on information within a player account.

9. The method of claim 8 wherein the information within the player account includes information about prior promotional selections by the player.

10. The method of claim 8 wherein the information within the player account includes registration information indicative of preferred promotions.

11. The method of claim 7 wherein the step of displaying a calendar includes displaying different images within particular day boxes over time resulting in a rolling display of icons.

12. The method of claim 11 wherein one of the images is a selection prompt icon.

13. The method of claim 11 wherein each promotion is associated with a single day box, each promotion including a plurality of images, each including a selection prompt icon, further including the step of displaying the selection prompt icons in an offset display so that not all selection prompt icons are displayed at the same time.

14. The method of claim 7 further including the steps of tracking play of the player over a time period, allowing player selection of day boxes on the calendar displayed associated with the current day played, and awarding a bonus to a player after the time period responsive to the player's selections.

15. Apparatus for communicating with a player of a gaming device on a network of gaming devices, said apparatus comprising:

a display associated with the networked gaming device, said display being operatively connected to the gaming device network and said display configured to display calendar day boxes including a calendar day associated with each promotion of a plurality promotions, at least one of said promotions being specific to a player at the gaming machine;

a computer operatively connected to the network, said computer in communication with a modeling parameters database configured to store modeling parameters and data comprising conditions that when satisfied allow one or more promotions to be generated, said computer configured to automatically generate one or more promotions in accordance with information stored in said modeling parameters database, said computer configured to store said generated one or more promotions in a promotion database, said computer configured to generate information about the promotions;

a circuit associated with said display configured to create an image on said display responsive to such information; and a touch screen associated with said display configured to accept a communication from the player indicative of a selection by the player of a promotion displayed in a calendar day box.

16. A promotions apparatus operable over a network in conjunction with a gaming machine, said promotions apparatus including:

a player database including a record of at least one player-preferred promotion for a player;

means at the gaming machine for determining a player's identity;

a configuration workstation coupled over a network to the gaming machine, said configuration workstation in communication with a modeling parameters database configured to store modeling parameters and data comprising conditions that when satisfied allow one or more player-preferred promotions to be generated, said configuration workstation configured to automatically generate a player-preferred promotion associated with the identified player in accordance with information stored in said modeling parameters database, said configuration workstation configured to store said generated player-preferred promotion in a promotion database, the configuration workstation including a content manager program operable to transmit a plurality of promotions over the network to the gaming machine including a calendar day associated with each promotion and wherein the content manager program is operable to transmit the player-preferred promotion to the gaming machine where it is displayable in a calendar box at the gaming machine responsive to the player's identity;

a touch screen display on the gaming machine operable to display a calendar screen image having a plurality of day boxes, with the promotions received from the configuration workstation being displayable in associated calendar day boxes, the calendar screen image displaying the player-preferred promotion;

the touch screen display allowing a player to make a selection of a day box associated with a promotion and displayed on the touch screen display; and means for implementing the selected promotion responsive to the selection by the player.

* * * * *